United States Patent
Doi et al.

(10) Patent No.: US 8,754,326 B2
(45) Date of Patent: Jun. 17, 2014

(54) PHOTOELECTRIC CONVERSION DEVICE

(75) Inventors: Katsuhiro Doi, Sakura (JP); Kenichi Okada, Sakura (JP); Hiroshi Matsui, Tokyo (JP)

(73) Assignee: Fujikura Ltd., Tokyo (JP)

( * ) Notice: Subject to any disclaimer, the term of this patent is extended or adjusted under 35 U.S.C. 154(b) by 141 days.

(21) Appl. No.: 13/093,374

(22) Filed: Apr. 25, 2011

(65) Prior Publication Data

US 2011/0192458 A1 Aug. 11, 2011

Related U.S. Application Data

(63) Continuation of application No. PCT/JP2009/005710, filed on Oct. 28, 2009.

(30) Foreign Application Priority Data

Oct. 30, 2008 (JP) ................................. 2008-279234
Oct. 30, 2008 (JP) ................................. 2008-279235

(51) Int. Cl.
*H01G 9/20* (2006.01)
*H01M 14/00* (2006.01)

(52) U.S. Cl.
CPC ........... *H01G 9/2077* (2013.01); *H01G 9/2022* (2013.01); *H01G 9/2059* (2013.01); *H01G 9/2031* (2013.01); *H01M 14/005* (2013.01); *Y02E 10/542* (2013.01)
USPC .......................................... 136/256; 136/263

(58) Field of Classification Search
CPC ........................... H01G 9/2077; H01G 9/2022
USPC ........................................................ 136/256
See application file for complete search history.

(56) References Cited

U.S. PATENT DOCUMENTS

2007/0284761 A1* 12/2007 Morooka et al. .............. 257/792
2009/0000661 A1* 1/2009 Yoshimoto et al. ........... 136/256
2010/0024875 A1* 2/2010 Fukui et al. ................... 136/256

FOREIGN PATENT DOCUMENTS

| EP | 2 043 191 A1 | 1/2009 |
| JP | 2003-297446 A | 10/2003 |
| JP | 2004-119149 A | 4/2004 |
| JP | 2004-171827 A | 6/2004 |
| JP | 2005-142089 A | 6/2005 |
| JP | 2005-243440 A | 9/2005 |
| JP | 2005-243557 A | 9/2005 |
| JP | 2005-346971 A | 12/2005 |
| JP | 2007-149652 A | 6/2007 |

(Continued)

OTHER PUBLICATIONS

Machine translation of JP2007157397, pub. Jun. 2007.*

(Continued)

*Primary Examiner* — Jonathan Johnson
*Assistant Examiner* — Allison Bourke
(74) *Attorney, Agent, or Firm* — Sughrue Mion, PLLC

(57) ABSTRACT

The present invention provides a photoelectric conversion device in which changes in photoelectric conversion efficiency with time can be inhibited. The photoelectric conversion device according to the present invention includes: a pair of electrodes; an electrolytic solution disposed between the pair of electrodes; and a sealing portion that links the pair of electrodes and is provided around the electrolytic solution. At least part of the sealing portion includes at least one inorganic sealing portion constituted by an inorganic material and at least one resin sealing portion constituted by a material including a resin. The inorganic sealing portion and the resin sealing portion are disposed along a direction connecting the pair of electrodes.

11 Claims, 11 Drawing Sheets

(56) References Cited

FOREIGN PATENT DOCUMENTS

| JP | 2007157397 | * | 6/2007 |
| JP | 2007-194075 A | | 8/2007 |
| JP | 2007-294387 A | | 11/2007 |
| JP | 2008-147037 A | | 6/2008 |
| WO | 2008 004566 A1 | | 1/2008 |
| WO | WO2008004556 | * | 1/2008 |

OTHER PUBLICATIONS

Machine translation of JP2007294387, pub. Nov. 2007.*
Extended European Search Report in corresponding European Patent Application No. 098023320.8 dated Sep. 24, 2012.
Office Action in corresponding Japanese Patent Application No. 2010-535674 dated Jan. 22, 2013.
Office Action dated May 28, 2013 in corresponding Chinese Patent Application No. 2009801432847.

* cited by examiner

F I G. 4
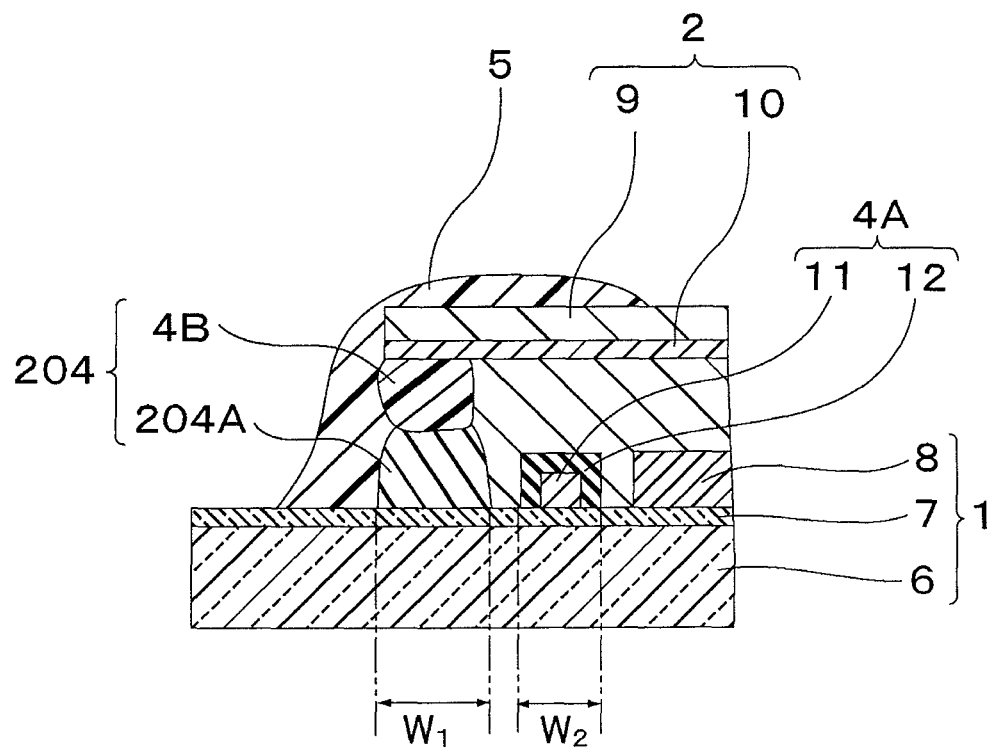

PHOTOELECTRIC CONVERSION DEVICE

CROSS REFERENCE TO RELATED APPLICATIONS

This application is a Continuation of National Stage of International Application No. PCT/JP2009/005710 filed Oct. 28, 2009, claiming priority based on Japanese Patent Applications No. 2008-279234 filed Oct. 30, 2008 and No. 2008-279235 filed Oct. 30, 2008, the contents of all of which are incorporated herein by reference in their entirety.

TECHNICAL FIELD

The present invention relates to a photoelectric conversion device.

BACKGROUND ART

Solar cells using silicon and dye-sensitized solar cells are known as photoelectric conversion devices. Among them, dye-sensitized solar cells have attracted attention since they are inexpensive and can obtain a high photoelectric conversion efficiency and various developments have been conducted toward further improvement in photoelectric conversion efficiency.

A dye-sensitized solar cell typically includes a working electrode having a semiconductor electrode provided on a transparent conductor, a counter electrode, a photosensitizing dye supported on the semiconductor electrode of the working electrode, an electrolytic solution disposed between the working electrode and the counter electrode, and a sealing portion provided between the working electrode and the counter electrode and around the electrolytic solution as main constituent elements, and the electrolytic solution is constituted, for example, by an electrolytic solution including an oxidation-reduction system (redox pair) such as, for example, $I^-/I_3^-$.

In such dye-sensitized solar cell, electrons in the photosensitizing dye are excited by the incident visible light, and the electrons are injected from the photosensitizing dye that has thus been excited into a conduction band of the semiconductor electrode and flow out to the external circuit. The electrons that have returned from the external circuit reduce triiodide ions ($I_3^-$) into iodide ions ($I^-$), the photosensitizing dye that has lost electrons and has been oxidized is re-reduced by the iodide ions ($I^-$), and electric power is thus generated.

As such dye-sensitized solar cell, a photoelectric chemical cell in which volatilization of the volatile solvent contained in the electrolytic solution can be prevented by heating and melting Himilan (trade name, manufactured by Du Pont-Mitsui Polychemicals Co., Ltd.), which is an ionomer, to seal the electrolytic solution has been generally suggested (see for example Patent Document 1).

Further, a photoelectric chemical cell has also been suggested in which volatilization of the volatile solvent contained in the electrolytic solution can be prevented by heating and melting an ethylene-vinyl alcohol copolymer to seal the electrolytic solution for the reason that the gas barrier ability of the copolymer is higher than that of Himilan (see for example Patent Document 2).

Further, in a dye-sensitized solar cell, a metal wiring is sometimes provided on the transparent conductor to take out a large current. When this metal wiring comes into contact with an electrolytic solution, corrosion occurs. For this reason, the metal wiring is covered with a wiring protection layer such as low-melting-point glass frit.

As such dye-sensitized solar cell, a dye-sensitized solar cell in which a metal wiring is disposed inside the sealing portion by constituting the sealing portion by the metal wiring and low-melting-point glass surrounding the metal wiring and photoelectric conversion efficiency is thus increased is also known (see for example Patent Document 3).

Patent Document 1: Japanese Patent Application Publication No. 2003-297446
Patent Document 2: Japanese Patent Application Publication No. 2007-149652
Patent Document 3: Japanese Patent Application Publication No. 2005-346971

DISCLOSURE OF THE INVENTION

Problem to be Solved by the Invention

However, in the photoelectric chemical cells described in Patent Documents 1 and 2, variations in photoelectric conversion efficiency with time cannot be said to be at a sufficiently low level.

With the dye-sensitized solar cell described in Patent Document 3, when a photoelectric conversion device is used under an environment with large variations in temperature, since the working electrode and counter electrode usually have different thermal expansion coefficients and the working electrode or counter electrode and the sealing material usually have different thermal expansion coefficients, stresses concentrate in the sealing material and peeling or damage such as cracks can occur in the sealing material. This can result in the leak of electrolytic solution, in particular the leak of organic solvent contained in the electrolytic solution. Therefore, although the dye-sensitized solar cell described in Patent Document 3 demonstrates high photoelectric conversion efficiency because the metal wiring is disposed inside the sealing portion, when the cell is used under an environment with large variations in temperature, variations in photoelectric conversion efficiency with time cannot be said to be at a sufficiently low level.

Accordingly, it is an object of the present invention to provide a photoelectric conversion device in which variations in photoelectric conversion efficiency with time can be sufficiently inhibited.

Means for Solving the Problem

As a result of conducting extensive studies on what causes the variations in photoelectric conversion efficiency with time to solve the above problems, the present inventors considered that what the leak of electrolytic solution, in particular the leak of the organic solvent contained in the electrolytic solution remains large is the main reason why the photoelectric conversion efficiency changes with time. After a great deal of consideration, the present inventors have found that the above-described problems can be solved by the following invention.

Thus, the present invention is a photoelectric conversion device including: a pair of electrodes; an electrolytic solution disposed between the pair of electrodes; and a sealing portion that links the pair of electrodes and is provided around the electrolytic solution, wherein at least part of the sealing portion comprises at least one inorganic sealing portion constituted by an inorganic material and at least one resin sealing portion constituted by a material including a first resin, and the inorganic sealing portion and the resin sealing portion are disposed along a direction connecting the pair of electrodes.

In this photoelectric conversion device, at least part of the sealing portion comprises at least one inorganic sealing portion and at least one resin sealing portion, and the inorganic sealing portion and the resin sealing portion are disposed along the direction connecting the pair of electrodes. Herein, the inorganic sealing portion is constituted by an inorganic material, and the resin sealing portion is constituted by a material including a first resin. Therefore, the inorganic sealing portion has sealing ability with respect to the electrolytic solution that is higher than that of the resin sealing portion. Further, in the photoelectric conversion device in accordance with the present invention, due to the presence of the inorganic sealing portion, it is possible to increase the ratio of the boundary surface of the inorganic sealing portion, which has high sealing ability with respect to the electrolytic solution, and the electrolytic solution in the boundary surface of the electrolytic solution and the sealing portion by comparison with that in the case in which the sealing portion is constituted only by the resin sealing portion.

Further, when the photoelectric conversion device is placed under an environment with large temperature variations and the pair of the electrodes have different thermal expansion coefficients, even if stresses are applied to the sealing portion, these stresses are relaxed by the resin sealing portion. Therefore, concentration of stresses in the inorganic sealing portion can be inhibited. Therefore, the occurrence of damage such as cracks in the inorganic sealing portion can be prevented.

Therefore, with the photoelectric conversion in accordance with the present invention, the leak of the electrolytic solution can be sufficiently inhibited and variations in photoelectric conversion efficiency with time can be sufficiently inhibited. As a result, an extended service life of the photoelectric conversion can be realized.

In the abovementioned photoelectric conversion device, for example, one electrode of the pair of electrodes has a first electrode, and the other electrode has a second electrode, in the sealing portion, the inorganic sealing portion is fixed on the first electrode, and the resin sealing portion links the inorganic sealing portion and the second electrode.

The abovementioned photoelectric conversion device may be configured such that one electrode of the pair of electrodes has a first electrode, and the other electrode has a second electrode, in the sealing portion, the resin sealing portion is fixed on the first electrode, and the inorganic sealing portion links the resin sealing portion and the second electrode.

Further, the abovementioned photoelectric conversion device may be configured such that one electrode of the pair of electrodes has a first electrode, and the other electrode has a second electrode, in the sealing portion, the inorganic sealing portion is fixed on the first electrode and the second electrode, and the resin sealing portion links the inorganic sealing portion fixed on the first electrode and the inorganic sealing portion fixed on the second electrode.

Furthermore, the abovementioned photoelectric conversion device may be configured such that one electrode of the pair of electrodes has a first electrode, and the other electrode has a second electrode, in the sealing portion, the resin sealing portion is fixed on the first electrode and the second electrode, and the inorganic resin sealing portion links the resin sealing portion fixed on the first electrode and the resin sealing portion fixed on the second electrode.

Further, in the abovementioned photoelectric conversion device, it is preferred that one electrode of the pair of electrodes has a first electrode, the other electrode of the pair of electrodes has a second electrode, the inorganic sealing portion is constituted by a wiring portion fixed on the first electrode, the wiring portion has a current-collecting wiring constituted by an inorganic material and provided on the first electrode and a wiring protection layer covering the current-collecting wiring, and the first electrode is a transparent electrode.

In this photoelectric conversion device, the electrolytic solution is disposed between the first electrode and the second electrode. Further, at least part of the sealing portion provided around the electrolytic solution has a wiring portion provided on the first electrode, which is a transparent electrode, and this wiring portion has a current-collecting wiring and a wiring protection layer that covers the current-collecting wiring. In other words, in at least part of the sealing portion, the current-collecting wiring is disposed as part of the sealing portion inside the sealing portion in a state of being protected by the wiring protection layer from the electrolytic solution. Thus, the current-collecting wiring is not provided on the side of the sealing portion that is opposite the side facing the outside and also not provided inside the sealing portion. Therefore, the surface area occupied by the current-collecting wiring and the sealing portion on the light incidence surface of the first electrode can be minimized and the amount of incident light blocked by the current-collecting wiring and the sealing portion can be minimized. Therefore, the light-receiving surface area can be enlarged and high photoelectric conversion efficiency can be obtained.

Further, the sealing portion is provided with a wiring portion and a resin sealing portion, and the wiring portion and the resin sealing portion are disposed along the direction connecting the transparent electrode and the counter electrode. Herein, the resin sealing portion is constituted by a material including a first resin. Therefore, when the photoelectric conversion device is placed under an environment with large temperature variations and the transparent electrode and the counter electrode have different thermal expansion coefficients, or the transparent electrode, counter electrode, and wiring portion have different thermal expansion coefficients, even if stresses are applied to the sealing portion, these stresses are relaxed by the resin sealing portion. Therefore, concentration of stresses in the wiring portion can be inhibited. Thus, the occurrence of damage such as cracks in the wiring portion can be prevented. As a result, the leak of the electrolytic solution caused by damage of the wiring portion can be prevented and variations in photoelectric conversion efficiency with time can be sufficiently inhibited.

Thus, with the above-described photoelectric conversion device, high photoelectric conversion efficiency can be obtained and variations in photoelectric conversion efficiency with time can be sufficiently inhibited even when the device is used under an environment with large temperature variations.

Herein, it is preferred that the sealing portion further include an inorganic sealing portion composed of an inorganic material provided on the second electrode, and the resin sealing portion link the wiring portion and the inorganic sealing portion.

In such photoelectric conversion device, the sealing ability of the wiring portion and the inorganic sealing portion in comparison with the electrolytic solution is higher than that of the resin sealing portion. Therefore, variations in photoelectric conversion efficiency with time can be more adequately inhibited.

Further, the abovementioned photoelectric conversion device may be configured such that the second electrode is also a transparent electrode, at least part of the sealing portion further includes an inorganic sealing portion provided on the second electrode, and the inorganic sealing portion is constituted by an inorganic material and by a second wiring portion having a second current-collecting wiring provided on the second electrode and a second wiring protection layer covering the second current-collecting wiring, and the resin sealing portion links the wiring portion and the second wiring portion.

In this case, since the second electrode is a transparent electrode, the photoelectric conversion portion receives light from both the first electrode side and the second electrode side. As a result, the photoelectric conversion efficiency can be further increased. Further, since the second current-collecting wiring is disposed as part of the sealing portion inside the sealing portion, the incident light blocked by the second current-collecting wiring and the sealing portion can be minimized and the photoelectric conversion efficiency may be further increased.

The abovementioned photoelectric conversion device may be configured such that one electrode of the pair of electrodes further has a photoelectric conversion portion that is in contact with the electrolytic solution, a working electrode is formed by the first electrode and the photoelectric conversion portion, and a counter electrode is formed by the second electrode.

Further, the abovementioned photoelectric conversion device may be configured such that the other electrode of the pair of electrodes further has a photoelectric conversion portion that is in contact with the electrolytic solution, a working electrode is formed by the second electrode and the photoelectric conversion portion, and a counter electrode is formed by the first electrode.

Further, the abovementioned photoelectric conversion device may be configured such that one electrode of the pair of electrodes includes a first electrode and a photoelectric conversion portion that is provided on the first electrode and is in contact with the electrolytic solution, the photoelectric conversion device further includes a wiring portion provided on the first electrode and between the sealing portion and the photoelectric conversion portion, and the wiring portion is constituted by an inorganic material and has a current-collecting wiring provided on the first electrode and a wiring protection layer covering the current-collecting wiring.

Herein, it is preferred that a width of the inorganic sealing portion be less than a width of the wiring portion. In this case, it is possible to make the light-receiving surface area, that is, an aperture ratio, larger.

Further, in the abovementioned photoelectric conversion device, it is preferred that one electrode of the pair of electrodes include a first electrode and a photoelectric conversion portion that is provided on the first electrode and is in contact with the electrolytic solution, the photoelectric conversion device further include a wiring portion provided on an opposite side of the photoelectric conversion portion to the sealing portion, on the first electrode, and the wiring portion be composed of a current-collecting wiring constituted by an inorganic material and provided on the first electrode.

Herein, it is preferred that a width of the inorganic sealing portion be less than a width of the wiring portion. In this case, it is possible to make the light-receiving surface area, that is, an aperture ratio in the photoelectric conversion device larger.

Further, in the abovementioned photoelectric conversion device, it is preferred that a second resin that at least covers a boundary of the sealing portion and the first electrode, a boundary of the sealing portion and the second electrode, and a boundary of the inorganic sealing portion and the resin sealing portion be provided on an opposite side of the sealing portion to the electrolytic solution. In this case, the leak of electrolytic solution is inhibited not only by the resin sealing portion, but also by the second resin. In particular, the interface leak of electrolytic solution through the interface of the sealing portion and the first electrode, interface of the sealing portion and the second electrode, and interface of the inorganic sealing portion and the resin sealing portion is effectively inhibited by the second resin.

The second resin preferably includes at least one species selected from the group consisting of an acid-modified polyethylene and a resin cured by ultraviolet ray.

When an acid-modified polyethylene or a resin cured by ultraviolet ray is used as the second resin, the bonding strength of the first electrode, second electrode, inorganic sealing portion, or first resin with the second resin is increased and the leak of the electrolytic solution on the respective interfaces can be inhibited.

The second resin may include at least one species selected from the group consisting of polyvinyl alcohol and an ethylene-vinyl alcohol copolymer.

When polyvinyl alcohol or an ethylene-vinyl alcohol copolymer is used as the second resin, since these resins have high gas barrier ability, the leak of the electrolytic solution in the second resin can be inhibited. Further, when the first resin includes at least one species of polyvinyl alcohol and an ethylene-vinyl alcohol copolymer, by ensuring the presence of a very small amount of water on the interface of the first resin and second resin, the two resins dissolve and bond mutually in the vicinity of the interface. Therefore, the leak of the electrolytic solution is inhibited even more effectively.

The first resin preferably includes at least one species selected from the group consisting of an acid-modified polyethylene and a resin cured by ultraviolet ray. When an acid-modified polyethylene or a resin cured by ultraviolet ray is used as the first resin, the bonding strength of the first electrode, second electrode, or inorganic sealing portion with the first resin is increased and the leak of the electrolytic solution on the respective interfaces can be inhibited.

The first resin may include at least one species selected from the group consisting of polyvinyl alcohol and an ethylene-vinyl alcohol copolymer.

When polyvinyl alcohol or an ethylene-vinyl alcohol copolymer is used as the first resin, since these resins have high gas barrier ability, the leak of the electrolytic solution in the first resin can be inhibited.

Effects of the Invention

In accordance with the present invention, provided is a photoelectric conversion device in which changes in photoelectric conversion efficiency with time can be sufficiently inhibited.

BRIEF DESCRIPTION OF THE DRAWINGS

FIG. 4 is a partially enlarged view of FIG. 3.

MODES FOR CARRYING OUT THE INVENTION

The embodiments of the photoelectric conversion device in accordance with the present invention will be explained in detail below.

First Embodiment

Figure 1:
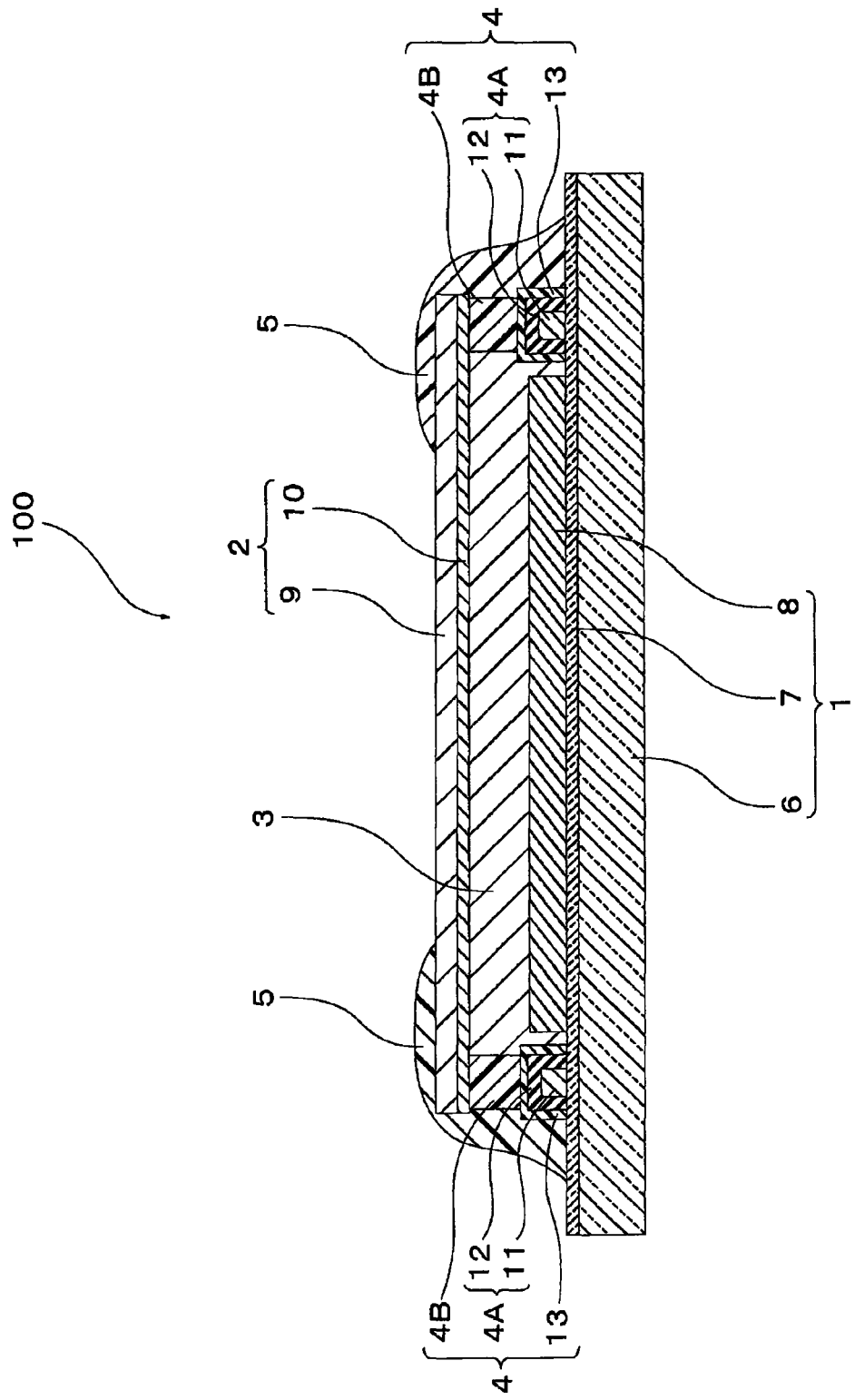
FIG. 1 is a cross-sectional view illustrating the first embodiment of the photoelectric conversion device in accordance with the present invention.
Figure 2:
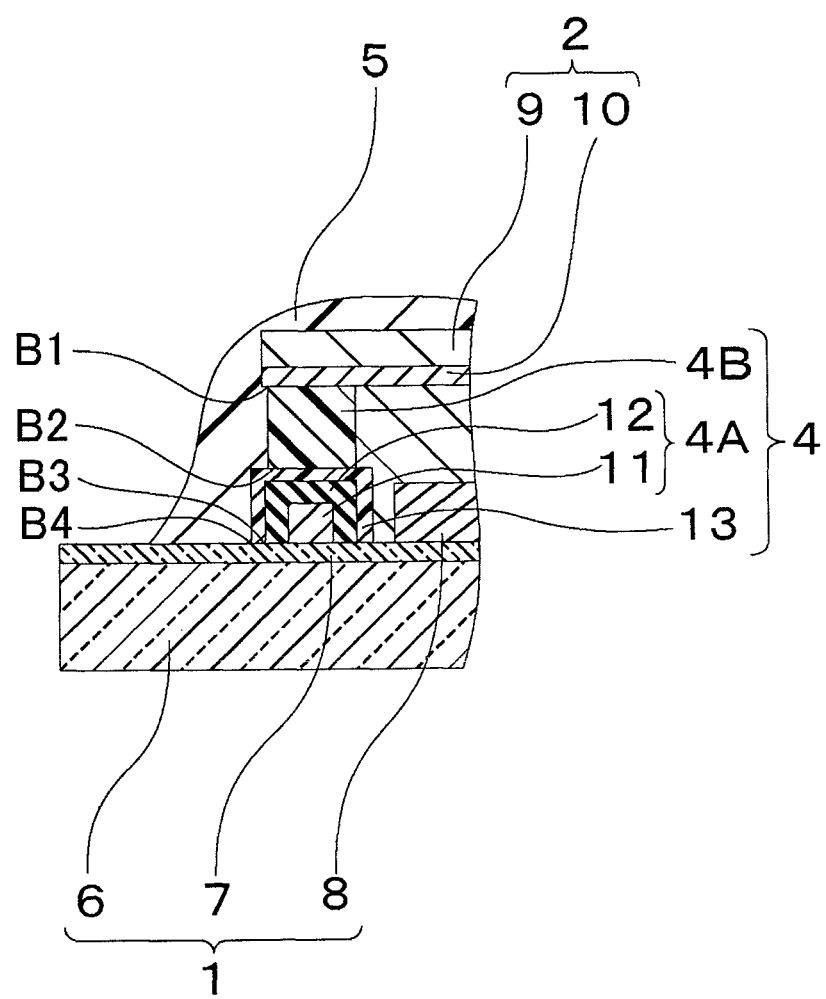
FIG. 2 is a partially enlarged view of FIG. 1.

FIG. 1 is a cross-sectional view illustrating the preferred embodiment of the photoelectric conversion device in accordance with the present invention. FIG. 2 is a partial enlarged view of FIG. 1. A photoelectric conversion device 100 shown in FIG. 1 is a dye-sensitized solar cell.

As shown in FIG. 1, the photoelectric conversion device 100 is provided with a working electrode 1 and a counter electrode (second electrode) 2 disposed so as to be opposite the working electrode 1. The working electrode 1 supports a photosensitizing dye. An electrolytic solution 3 is disposed between the working electrode 1 and the counter electrode 2, and a sealing portion 4 is provided between the working electrode 1 and the counter electrode 2 around the electrolytic solution 3. As shown in FIG. 2, in the sealing portion 4, a second resin 5 is provided so as to cover at least a boundary B1 of the sealing portion 4 and the counter electrode 2 and a boundary B4 of the sealing portion 4 and the working electrode 1.

The working electrode 1 is provided with a transparent electrode (first electrode) composed of a transparent substrate 6 and a transparent conductive layer 7 provided on the side of the transparent substrate 6 that faces the counter electrode 2 and a semiconductor portion 8 serving as one photoelectric conversion portion provided on the transparent conductive layer 7. The photosensitizing dye is supported on the semiconductor portion 8. The semiconductor portion 8 is in contact with the electrolytic solution.

The material constituting the transparent substrate 6 may be a transparent material. Examples of such transparent material include glass, polyethylene terephthalate (PET), polyethylene naphthalate (PEN), polycarbonates (PC), and polyethersulfones (PES).

Examples of the material constituting the transparent conductive layer 7 include conductive metal oxides such as tin-doped indium oxide (Indium-Tin-Oxide: ITO), tin oxide ($SnO_2$), fluorine-doped tin oxide (FTO). The transparent conductive layer 7 may be constituted by a single layer or by a laminated body of a plurality of layers constituted by different conductive metal oxides. When the transparent layer 7 is constituted by a single layer, it is preferred that the transparent conductive layer 7 be constituted by FTO since such a layer has high heat resistance and chemical resistance. When a laminated body constituted by a plurality of layers is used for the transparent conductive layer 7, it is preferred that the laminated body be capable of reflecting the properties of each layer. Above all, it is preferred that a laminated body including a layer constituted by ITO and a layer constituted by FTO be used. In this case, the transparent conductive layer 7 having high conductivity, heat resistance, and chemical resistance can be realized. The thickness of the transparent conductive layer 7 may be for example within a range of 0.01 µm to 2 µm.

The semiconductor portion 8 has one semiconductor layer constituted by a porous oxide semiconductor film. The porous oxide semiconductor film constituting the semiconductor layer is constituted, for example, by oxide semiconductor particles which are constituted by titanium oxide ($TiO_2$), zinc oxide (ZnO), tungsten oxide ($WO_3$), niobium oxide ($Nb_2O_5$), strontium titanate ($SrTiO_3$), tin oxide ($SnO_2$), indium oxide ($In_2O_3$), zirconium oxide ($ZrO_2$), thallium oxide ($Ta_2O_5$), lanthanum oxide ($La_2O_3$), yttrium oxide ($Y_2O_3$), holmium oxide ($Ho_2O_3$), bismuth oxide ($Bi_2O_3$), cerium oxide ($CeO_2$), aluminum oxide ($Al_2O_3$), or combinations of two or more thereof. It is preferred that the average particle size of these oxide semiconductor particles be 1 nm to 1000 nm, since the surface area of the oxide semiconductor covered with a dye is increased, that is, a field performing photoelectric conversion is expanded and a larger number of electrons can be generated. In this case, the semiconductor layer is preferably constituted by piling up oxide semiconductor particles of different particle size distributions. In this case, light reflection can be repeatedly induced inside the semiconductor layer, and light can be efficiently converted into electrons, without loss of the incident light to the outside of the semiconductor layer. The thickness of the semiconductor portion 8 may be, for example, 0.5 µm to 50 µm. The semiconductor portion 8 can be also constituted by a laminated body of a plurality of semiconductor layers composed of different materials.

Ruthenium complexes having a ligand including a bipyridine structure or terpyridine structure, or organic dyes such as porphyrin, eosin, rhodamine, and merocyanine can be used as the photosensitizing dye.

The counter electrode 2 is provided with a conductive layer 9 and a catalyst layer 10 that is provided on the side of the conductive layer 9 facing the working electrode 1 and enhances the reduction reaction at the surface of the counter electrode 2.

The conductive layer 9 is constituted by a corrosion-resistant metal material such as titanium, nickel, platinum, molybdenum, and tungsten, a conductive oxide such as ITO and FTO, carbon, or conductive polymers.

The catalyst layer 10 is constituted by platinum, carbon-based material, and conductive polymers.

The electrolytic solution 3 includes, for example, a redox pair such as $I^-/I_3^-$ and an organic solvent. Examples of organic solvents include: acetonitrile, methoxyacetonitrile, propionitrile, ethylene carbonate, propylene carbonate, diethyl carbonate, and γ-butyrolactone. The redox pair may be, for example, a pair such as a bromine/bromide ion in addition to $I^-/I_3^-$.

Examples of the electrolytic solution 3 include an electrolytic solution obtained by dissolving a predetermined amount of 1-methyl-3-methylimidazolium iodide, LiI, $I_2$, and 4-t-butylpyridine in ionic liquid electrolyte, for example, 1-ethyl-3-methylimidazolium bis(trifluoromethylsulfonyl)imide. Further, a nanocomposite ion gel electrolyte, which is a pseudo-solid electrolyte in a gel form obtained by mixing nanoparticles such as $SiO_2$, $TiO_2$, and carbon nanotubes with the ionic liquid electrolyte, may be also used as the electrolytic solution 3. An ionic liquid electrolyte can be also gelled by using an organic gelling agent such as polyvinylidene fluoride, a polyethylene oxide derivative or an amino acid derivative.

The sealing portion 4 links the working electrode 1 and the counter electrode 2 and includes a wiring portion 4A serving as an inorganic sealing portion that is fixed on the surface of the working electrode 1 that faces the counter electrode 2 and a resin sealing portion 4B linking the wiring portion 4A and the counter electrode 2. The wiring portion 4A and resin sealing portion 4B are arranged in a row along the direction connecting the working electrode 1 and the counter electrode 2. Thus, the wiring portion 4A and the resin sealing portion 4B are arranged in a row along the direction from the working electrode 1 to the counter electrode 2.

In the present embodiment, the wiring portion 4A is provided so as to be on the surface of the transparent conductive layer 7 and enclose the semiconductor portion 8. In the present embodiment, the current-collecting wiring 11 is present inside the wiring portion 4A, the entire current-collecting wiring 11 is covered by a wiring protective layer 12, and contact between the electrolytic solution 3 and the current-collecting wiring 11 is prevented. Thus, the wiring protection layer 12 is provided so as to straddle the current-collecting wiring 11. In other words, in the photoelectric conversion device 100 of the present embodiment, the wiring portion 4A is effectively used as an inorganic sealing portion. The wiring protection layer 12 may or may not be in contact with the transparent conductive layer 7 of the working electrode 1, as long as the wiring protection layer covers the entire current-collecting wiring 11.

The material constituting the current-collecting wiring 11 may be a material having an electric resistance lower than that of the transparent conductive layer 7. Examples of such material include metals such as gold, silver, copper, platinum, aluminum, titanium, and nickel.

Examples of the material constituting the wiring protection layer 12 include inorganic insulating materials such as a lead-free transparent low-melting-point glass frit.

It is preferred that the wiring protection layer 12 be covered with a third resin 13 having chemical resistance so as to prevent the contact between the electrolytic solution 3 and the current-collecting wiring 11 over a longer period and also prevent the appearance of dissolved components of the wiring protection layer 12 in the case in which the electrolytic solution 3 has come into contact with the wiring protection layer 12.

Examples of the third resin include polyimides, fluororesins, resins cured by ultraviolet ray and also an acid-modified polyethylene, polyvinyl alcohol and an ethylene-vinyl alcohol copolymer. The acid-modified polyethylene means a compound obtained by random copolymerization, alternate copolymerization, block copolymerization, or graft copolymerization of polyethylene with an acid or compounds obtained by neutralization thereof with metal ions. For example, an ethylene-methacrylic acid copolymer is obtained by copolymerization of ethylene and methacrylic acid and is an acid-modified polyethylene. An ionomer obtained by neutralization of an ethylene-methacrylic acid copolymer with metal ions is also an acid-modified polyethylene.

The resin sealing portion 4B may be constituted by a material including a first resin. The resin sealing portion is also called a resin portion. The first resin may be any resin if it is a resin, but it is preferred that the first resin be an acid-modified polyethylene or a resin cured by ultraviolet ray. When an acid-modified polyethylene or a resin cured by ultraviolet ray is used as the first resin, the adhesion between the transparent electrode of the working electrode 1, counter electrode 2, or wiring portion 4A and the first resin is strong, and the leak of the electrolytic solution 3 at the interfaces thereof can be inhibited. Further, the first resin may also be polyvinyl alcohol or an ethylene-vinyl alcohol copolymer. When polyvinyl alcohol or an ethylene-vinyl alcohol copolymer is used as the first resin, since these resins have high gas barrier ability, the leak of the electrolytic solution 3 in the first resin can be inhibited.

It is more preferred that the first resin be an acid-modified polyethylene. In this case, in addition to the aforementioned reasons, since an acid-modified polyethylene is extremely stable against organic solvents contained in the electrolytic solution 3, physical properties of the first resin, such as flexibility and adhesive ability, can be maintained over a long period. It is even more preferred that an acid-modified polyethylene be an ethylene-methacrylic acid copolymer, an ionomer, or polyethylene modified by maleic anhydride. In this case, in addition to the above-described reasons, since the polarity of the first resin is high, adhesion to the transparent electrode of the working electrode 1, counter electrode 2, or wiring portion 4A becomes even stronger.

The resin sealing portion 4B may be constituted only by a resin or by a resin and an inorganic filler.

An acid-modified polyethylene or a resin cured by ultraviolet ray is preferred as a second resin 5. When an acid-modified polyethylene or a resin cured by ultraviolet ray is used as the second resin 5, strong adhesion between the transparent electrode of the working electrode 1, counter electrode 2, wiring portion 4A, or the first resin and second resin becomes strong, and the leak of the electrolytic solution 3 at the interfaces thereof can be inhibited. The second resin 5 is preferably polyvinyl alcohol or an ethylene-vinyl alcohol copolymer. When polyvinyl alcohol or an ethylene-vinyl alcohol copolymer is used as the second resin 5, since these resins have high gas barrier ability, the leak of the electrolytic solution 3 in the second resin 5 can be inhibited. When the first resin includes at least one species of polyvinyl alcohol and an ethylene-vinyl alcohol copolymer, by ensuring the presence of a very small amount of water on the interface of the first resin and second resin, the two resins dissolve and bond mutually in the vicinity of the interface. Therefore, the leak of the electrolytic solution 3 is inhibited even more adequately. The abovementioned resins may be used individually as the second resin 5 or two or more of these resins may be mixed or laminated. It is preferred that the second resin 5 be different from the resin contained in the resin sealing portion 4B or a third resin 13, because this enables optimum selection of the resins according to the functions thereof, for example, strength, ability to inhibit the permeation of the leaking liquid, and heat resistance.

However, when the second resin 5 is a resin including repeating units identical to the resin contained in the resin sealing portion 4B or a third resin 13, there is an advantage that adhesion at the interfaces is improved since the resins are likely to have similar properties in thermal properties, solubility in solvents, and response to light. For example, if the second resin 5 and the resin sealing portion 4B both include at least one species selected from the group consisting of an acid-modified polyethylene and an ethylene-vinyl alcohol copolymer, since these resins include repeating units of unsaturated carbon chains corresponding to ethylene, they can be easily fused by heating and will maintain the original physical properties even after cooling. Therefore, strong bonds can be obtained when bonding interfaces thereof are thermally fused and bonded together.

If the second resin 5 and the resin sealing portion 4B both include at least one species selected from the group consisting of polyvinyl alcohol and an ethylene-vinyl alcohol copolymer, since both include repeating units of unsaturated carbon chains having hydroxyl groups corresponding to vinyl alcohol, the resins are soluble in water. As a result, by ensuring the presence of a very small amount of water on the bonding interfaces, it is possible to make the resins compatible to each other in the vicinity of the interfaces and strongly bond the resins together.

In the present embodiment, the second resin 5 covers not only the boundary B1 of the sealing portion 4 and the counter electrode 2 and the boundary B4 of the sealing portion 4 and the working electrode 1, but also the boundary B2 of the third resin 13 and the resin sealing portion 4B and the boundary B3 of the third resin 13 and the wiring portion 4A. In this case, the third resin 13 forms a boundary of the wiring portion 4A and the resin sealing portion 4B, and the third resin 13 is covered by the second resin 5.

The operation and effect of the photoelectric conversion device 100 will be explained below.

In the above-described photoelectric conversion device 100, the sealing portion 4 is provided with the wiring portion 4A and the resin sealing portion 4B connecting the wiring portion 4A and the counter electrode 2, and the wiring portion 4A and the resin sealing portion 4B are arranged in a row along the direction connecting the working electrode 1 and the counter electrode 2. Herein, the wiring portion 4A is constituted by the current-collecting wiring 11 and the wiring protection layer 12, and both the current-collecting wiring 11 and the wiring protection layer 12 are constituted by inorganic materials. By contrast, the resin sealing portion 4B is constituted by a material including the first resin. Therefore, the wiring portion 4A has sealing ability with respect to the electrolytic solution 3 higher than that of the resin sealing portion 4B. Further, in the photoelectric conversion device 100, because of the presence of the wiring portion 4A, the ratio of the interface surface of the wiring portion 4A, which has high sealing ability with respect to the electrolytic solution 3, and the electrolytic solution 3 in the interface surface of the electrolytic solution 3 and the sealing portion 4 can be increased by comparison with that in the case in which the sealing portion 4 is constituted only by the resin sealing portion 4B.

Thus, in the case in which the sealing portion 4 is constituted only by the resin sealing portion 4B, the leak of the electrolytic solution 3 tends to occur comparatively easily in the resin sealing portion 4B. Therefore, it may be said that the leak cross-sectional area of the electrolytic solution 3 becomes large in the sealing portion 4. By contrast, since the sealing portion 4 of the present embodiment includes not only the resin sealing portion 4B, but also the wiring portion 4A, the surface area of the resin sealing portion 4 where the leak of the electrolytic solution 3 occurs comparatively easily, that is, the leak cross-sectional area of the electrolytic solution 3, is reduced.

As a result, with the photoelectric conversion device 100, the leak of the electrolytic solution 3 can be sufficiently inhibited and therefore changes in the photoelectric conversion efficiency with time can be sufficiently inhibited. Therefore, a longer service life of the photoelectric conversion device 100 can be realized.

In the photoelectric conversion device 100 of the present embodiment, the semiconductor portion 8 can be enlarged by disposing the current-collecting wiring 11 inside the wiring portion 4A. More specifically, the surface area of the interface of the semiconductor portion 8 and the transparent conductive layer 7 can be enlarged. Therefore, a ratio (a ratio of the surface area of the interface of the semiconductor portion 8 and the transparent conductive layer 7 constituting the working electrode 1 to the surface area of the portion surrounded by the sealing portion 4 in the surface of the transparent conductive layer 7 constituting the working electrode 1 on the side facing the counter electrode 2) contributing to power generation can be increased and photoelectric conversion efficiency per the working electrode 1 can be increased.

In the above-mentioned photoelectric conversion device 100, the sealing portion 4 is provided with the wiring portion 4A and the resin sealing portion 4B linking the wiring portion 4A and the counter electrode 2, and the wiring portion 4A and the resin sealing portion 4B are disposed in a row along the direction connecting the transparent conductive layer 7 and the counter electrode 2. Herein, the wiring portion 4A is constituted by the current-collecting wiring 11 and the wiring protection layer 12, and these current-collecting wiring 11 and the wiring protection layer 12 are both constituted by inorganic materials. By contrast, the resin sealing portion 4B is constituted by a material including a resin. Therefore, the resin sealing portion 4B has stress relaxation ability higher than that of the wiring portion 4A.

Where the sealing portion 4 is constituted only by the wiring portion 4A composed of the current-collecting wiring 11 and the wiring protection layer 12, when the photoelectric conversion device 100 is placed under an environment with large temperature variations, stresses can be concentrated in the wiring portion 4A due to a difference in thermal expansion coefficient between the transparent electrode of the working electrode 1 and the counter electrode 2. Due to the stresses, the wiring portion 4A tends to peel off from the transparent conductive layer 7, cracks tend to appear in the wiring portion 4A, and the leak of the electrolytic solution 3 tends to occur easily. By contrast, since the sealing portion 4 of the present embodiment is provided not only with the wiring portion 4A, but also with the resin sealing portion 4B, when the stresses are applied to the sealing portion 4, the applied stresses are absorbed by the resin sealing portion 4B.

Therefore, with the photoelectric conversion device 100, even when the photoelectric conversion device 100 is used under an environment with large temperature variations, the occurrence of peeling and damage such as cracks in the wiring portion 4A can be prevented. Therefore, the leak of the electrolytic solution 3 caused by the damage of the wiring portion 4A can be prevented and therefore changes in the photoelectric conversion efficiency with time can be sufficiently inhibited.

Further, in the photoelectric conversion device 100 of the present embodiment, where the current-collecting wiring 11 is disposed on the side of the sealing portion 4 that is opposite the side facing the semiconductor portion 8, an area to be occupied by the current-collecting wiring 11 is needed on the side of the sealing portion 4 that is opposite the side facing the semiconductor portion 8. Meanwhile, where the current-collecting wiring 11 is disposed between the sealing portion 4 and the semiconductor portion 8, the semiconductor portion 8 cannot be brought sufficiently close to the sealing portion 4 due to the presence of the current-collecting wiring 11 and the surface area of the semiconductor is decreased.

By contrast, with the photoelectric conversion device 100 of the present embodiment, the current-collecting wiring 11 is provided in the sealing portion 4 neither on the side of the sealing portion 4 that is opposite the side facing the semiconductor portion 8, nor on the side of the sealing portion 4 that faces the semiconductor portion 8. Thus, the current-collecting wiring is provided as part of the sealing portion 4 inside the sealing portion 4. Therefore, the surface area occupied by the current-collecting wiring 11 and the sealing portion 4 in the light incidence surface of the working electrode 1 can be minimized, and the incident light blocked by the current-collecting wiring 11 and the sealing portion 4 can be minimized. Therefore, the surface area of the semiconductor portion 8 along the surface of the transparent conductive layer 7 can be enlarged. As a result, according to photoelectric conversion device 100, it is possible to obtain high photoelectric conversion efficiency.

Further, with the photoelectric conversion device 100, in the sealing portion 4, the second resin 5 is provided so as to cover the boundary B1 of the sealing portion 4 and the counter electrode 2, the boundary B4 of the sealing portion 4 and the working electrode 1, the boundary B2 of the third resin 13 and the resin sealing portion 4B, and the boundary B3 of the third resin 13 and the wiring portion 4A. Therefore, the leak of the electrolytic solution 3 is inhibited not only by the resin sealing portion 4B, but also by the second resin 5. In particular, the leak of the electrolytic solution 3 through the interface of the sealing portion 4 and the working electrode 1, the interface of the sealing portion 4 and the counter electrode 2, the interface of the third resin 13 and the resin sealing portion 4B, and the interface of the third resin 13 and the wiring portion 4A can be effectively inhibited by the second resin 5. Therefore, changes in photoelectric conversion efficiency with time can be inhibited more sufficiently.

The photoelectric conversion device 100 of the present embodiment is particularly effective when the counter electrode 2 is a thin flexible material such as a metal foil. Thus, when the counter electrode 2 is constituted by a flexible material such as a metal foil, where the resin sealing portion 4B, rather than the wiring portion 4A, is fixed to the counter electrode 2, the resin sealing portion 4B follows the deformation of the counter electrode 2 more easily than the wiring portion 4A. As a result, cracks are unlikely to occur in the wiring portion 4A and the resin sealing portion 4B is unlikely to peel off from the counter electrode 2.

Next, a method for manufacturing the photoelectric conversion device 100 will be explained below.

First, the working electrode 1 and the counter electrode 2 are prepared.

The working electrode 1 can be obtained by forming the transparent conductive layer 7 on the transparent substrate 6, then forming the semiconductor portion 8 on the transparent conductive layer 7, and causing a photosensitizing dye to support on the semiconductor portion 8.

Examples of methods for forming the transparent conductive layer 7 on the transparent substrate 6 include, for example, sputtering, vapor deposition, spray pyrolysis deposition (SPD), and CVD.

The semiconductor portion 8 is usually constituted by a porous oxide semiconductor film. The porous oxide semiconductor film can be obtained, for example, by sintering the above-described oxide semiconductor particles.

Then, the current-collecting wiring 11 is formed on at least part of the periphery of the semiconductor portion 8 in the working electrode 1, and then the wiring protection layer 12 is formed so as to cover the current-collecting wiring 11 and also to surround the periphery of the semiconductor portion 8. The wiring portion 4A is thus obtained around the semiconductor portion 8.

The current-collecting wiring 11 can be obtained, for example, by compounding metal particles constituting the above-described current-collecting wiring 11 with a thickening agent such as polyethylene glycol to obtain a paste, coating the paste by using a screen printing method or the like to surround the semiconductor portion 8, and calcining by heating. Further, when the working electrode 1 is conductive glass, the current-collecting wiring 11 is strongly bonded to the working electrode 1 by mixing a low-melting-point glass frit with the above-described paste.

The wiring protection layer 12 can be obtained, for example, by compounding, if necessary, a thickening agent, a binder, a dispersant, and a solvent with an inorganic insulating material such as the aforementioned low-melting-point glass frit to obtain a paste, coating the paste by screen printing method or the like so as to cover the entire current-collecting wiring 11 and calcining by heating.

In order to prevent the contact of the electrolytic solution 3 with the current-collecting wiring 11 over a longer period and also to prevent the appearance of dissolved components of the wiring protection layer 12 in the case in which the electrolytic solution 3 has come into contact with the wiring protection layer 12, it is preferred that the wiring protection layer 12 be covered with the third resin 13 having chemical resistance, such as a polyimide, a fluororesin, an acid-modified polyethylene, polyvinyl alcohol, an ethylene-vinyl alcohol copolymer, and a resin cured by ultraviolet ray. The sealing portion 4 can be covered with the third resin 13, for example, in the following matter. When the third resin 13 is a thermoplastic resin, the third resin 13 can be obtained by coating the molten third resin 13 on the wiring protection layer 12 and then cooling naturally at room temperature, or by bringing a film-like third resin 13 into contact with the wiring protection layer 12, heating and melting the film-like third resin 13 by an external heat source, and then cooling naturally at room temperature. For example, an ionomer, an ethylene-methacrylic acid copolymer, or polyethylene modified with maleic anhydride can be used as the thermoplastic third resin 13. When the third resin 13 is a resin cured by ultraviolet ray, the third resin 13 can be obtained by coating the ultraviolet curable resin, which is a precursor of the third resin 13, on the wiring protection layer 12 and then curing the aforementioned ultraviolet curable resin by ultraviolet ray. When the third resin 13 is a water-soluble resin, the third resin 13 can be obtained by coating an aqueous solution including the third resin 13 on the wiring protection layer 12. For example, vinyl alcohol polymer, and an ethylene-vinyl alcohol copolymer can be used as the water-soluble third resin 13.

In order to cause the photosensitizing dye to support on the semiconductor portion 8 of the working electrode 1, usually, the working electrode 1 obtained by forming the semiconductor portion 8 on the transparent conductive layer 7 is immersed in a solution including the photosensitizing dye, the dye is adsorbed on the semiconductor portion 8 and then the extra dye is washed out with the solvent component of the abovementioned solution and dried. Thus, the photosensitizing dye is adsorbed on the semiconductor portion 8. However, it is also possible to cause the photosensitizing dye to support on the semiconductor portion 8 by coating a solution including the photosensitizing dye on the semiconductor portion 8 and drying, thereby causing the adsorption of the photosensitizing dye to adsorb on the semiconductor portion 8 constituted by a porous oxide semiconductor film.

Meanwhile, the counter electrode 2 can be obtained by forming the catalyst layer 10 on the conductive layer 9. In the counter electrode 2, the conductive layer 9 is constituted, for example, by a metal foil composed of the abovementioned metal material, and the catalyst layer 10 can be formed by sputtering by using platinum or the like. In this case, even if an uneven structure is formed due to a difference in height between the wiring protection layer 12 and the semiconductor portion 8 measured by taking the surface of the transparent conductive layer 7 of the working electrode 1 as a reference level, the counter electrode 2 can be easily deformed to follow the uneven structure.

Then, the first resin or a precursor thereof for linking the wiring portion 4A and the counter electrode 2 is formed on the counter electrode 2. When the first resin is a thermoplastic resin, the first resin can be obtained by coating the molten first resin on the counter electrode 2 and then cooling naturally at room temperature, or by bringing a film-like first resin into contact with the counter electrode 2, heating and melting the film-like first resin by an external heat source, and then cooling naturally at room temperature. For example, an ionomer, an ethylene-methacrylic acid copolymer, or polyethylene modified with maleic anhydride can be used as the thermoplastic first resin. When the first resin is a resin cured by ultraviolet ray, the ultraviolet curable resin, which is a precursor of the first resin, is coated on the counter electrode 2. When the first resin is a water-soluble resin, an aqueous solution including the first resin is coated on the counter electrode 2. For example, a vinyl alcohol polymer and an ethylene-vinyl alcohol copolymer can be used as the water-soluble first resin.

The working electrode 1 and the counter electrode 2 are disposed opposite each other, the first resin and the wiring portion 4A are superimposed, and a laminated body is formed. When the first resin is a thermoplastic resin, the first resin is heated and melted and the wiring portion 4A and the counter electrode 2 are bonded together. As a result, the resin sealing portion 4B linking the wiring portion 4A and the counter electrode 2 is obtained therebetween. When the first resin is a resin cured by ultraviolet ray, the abovementioned ultraviolet curable resin is cured by ultraviolet ray after the laminated body has been formed, and the resin sealing portion 4B linking the wiring portion 4A and the counter electrode 2 is obtained therebetween. When the first resin is a water-soluble resin, finger-touch drying is conducted at room temperature after the laminated body has been formed, then drying is performed under low-humidity atmosphere, and the resin sealing portion 4B linking the wiring portion 4A and the counter electrode 2 is obtained therebetween.

Next, the space surrounded by the working electrode 1, counter electrode 2, and sealing portion 4 is filled with the electrolytic solution 3. The space can be filled with the electrolytic solution 3, for example, by pouring the electrolytic solution 3 via an electrolytic solution injection port (not shown in the figure) that has been formed in advance in the counter electrode 2 and finally sealing the electrolytic solution injection port with the abovementioned first resin.

Then, the sealing portion 4 is then covered with the second resin 5. When the second resin 5 is a thermoplastic resin, the second resin 5 can be obtained by coating the molten second resin 5 on the sealing portion 4 and then cooling naturally at room temperature, or bringing a film-like second resin 5 into contact with the sealing portion 4, heating and melting the film-like second resin 5 by an external heat source, and then cooling naturally at room temperature. For example, an ionomer, an ethylene-methacrylic acid copolymer, or polyethylene modified with maleic anhydride can be used as the thermoplastic second resin 5.

When the second resin 5 is a resin cured by ultraviolet ray, the second resin 5 can be obtained by coating the ultraviolet curable resin, which is a precursor of the second resin 5, on the sealing portion 4 and then curing the ultraviolet curable resin, which is a precursor of the second resin 5, with ultraviolet ray. As a precursor for the resin cured by ultraviolet ray that constitutes the second resin 5, 31x-101 (ThreeBond Co.) can be used.

When the second resin 5 is a water-soluble resin, the second resin 5 can be obtained by coating an aqueous solution including the second resin 5 on the sealing portion 4 and drying, for example, under the ambient atmosphere at room temperature. For example, vinyl alcohol polymer and an ethylene-vinyl alcohol copolymer can be used as the water-soluble second resin 5. Regardless of whether the second resin 5 is a thermoplastic resin, resin cured by ultraviolet ray, or water-soluble resin, it is preferred that the second resin be provided so as to cover at least the boundary B1 of the sealing portion 4 and the counter electrode 2, the boundary B4 of the sealing portion 4 and the working electrode 1, the boundary B2 of the third resin 13 and the resin sealing portion 4B, and the boundary B3 of the third resin 13 and the wiring portion 4A. For this purpose, the second resin 5 is coated not only on the sealing portion 4, but also on the peripheral edge of the counter electrode 2 and a portion outside the sealing portion 4 in the transparent conductive layer 7 constituting the working electrode 1. When the second resin 5 is a sheet-like thermoplastic resin, the sheet of the second resin 5 is also brought into contact with the peripheral edge of the counter electrode 2 and a portion outside the sealing portion 4 in the transparent conductive layer 7 constituting the working electrode 1 and the film-like second resin 5 is heated and melted by an external heat source.

Thus, the production of the photoelectric conversion device 100 is completed.

When the electrolytic solution 3 is constituted by the above-described nanocomposite ion gel electrolyte, the electrolytic solution 3 is disposed between the working electrode 1 supporting the dye and the counter electrode 2 in the following matter. Thus, before the working electrode 1 supporting the dye and the counter electrode 2 are disposed opposite each other, the paste including the above-mentioned nanocomposite ion gel electrolyte is coated, for example by a screen printing method, on the inner region of the wiring portion 4A on the working electrode 1 supporting the dye. Then, the working electrode 1 supporting the dye and the counter electrode 2 are disposed opposite each other, the first resin and the wiring portion 4A are superimposed, and a laminated body is formed. When the first resin is a thermoplastic resin, the first resin is heated and melted and the wiring portion 4A and the counter electrode 2 are bonded together. The resin sealing portion 4B linking the wiring portion 4A and the counter electrode 2 is thus obtained therebetween. When the first resin is a resin cured by ultraviolet ray, the abovementioned ultraviolet curable resin is cured by ultraviolet ray after the laminated body has been formed, and the resin sealing portion 4B linking the wiring portion 4A and the counter electrode 2 is obtained therebetween. When the first resin is a water-soluble resin, finger-touch drying is conducted at room temperature after the laminated body has been formed, then drying is performed under low-humidity atmosphere, and the resin sealing portion 4B linking the wiring portion 4A and the counter electrode 2 is obtained therebetween. The electrolytic solution 3 constituted by the above-described nanocomposite ion gel electrolyte can thus be disposed between the working electrode 1 and the counter electrode 2. The sealing portion 4 is then covered with the second resin 5 and the photoelectric conversion device 100 is obtained.

Second Embodiment

Figure 3:
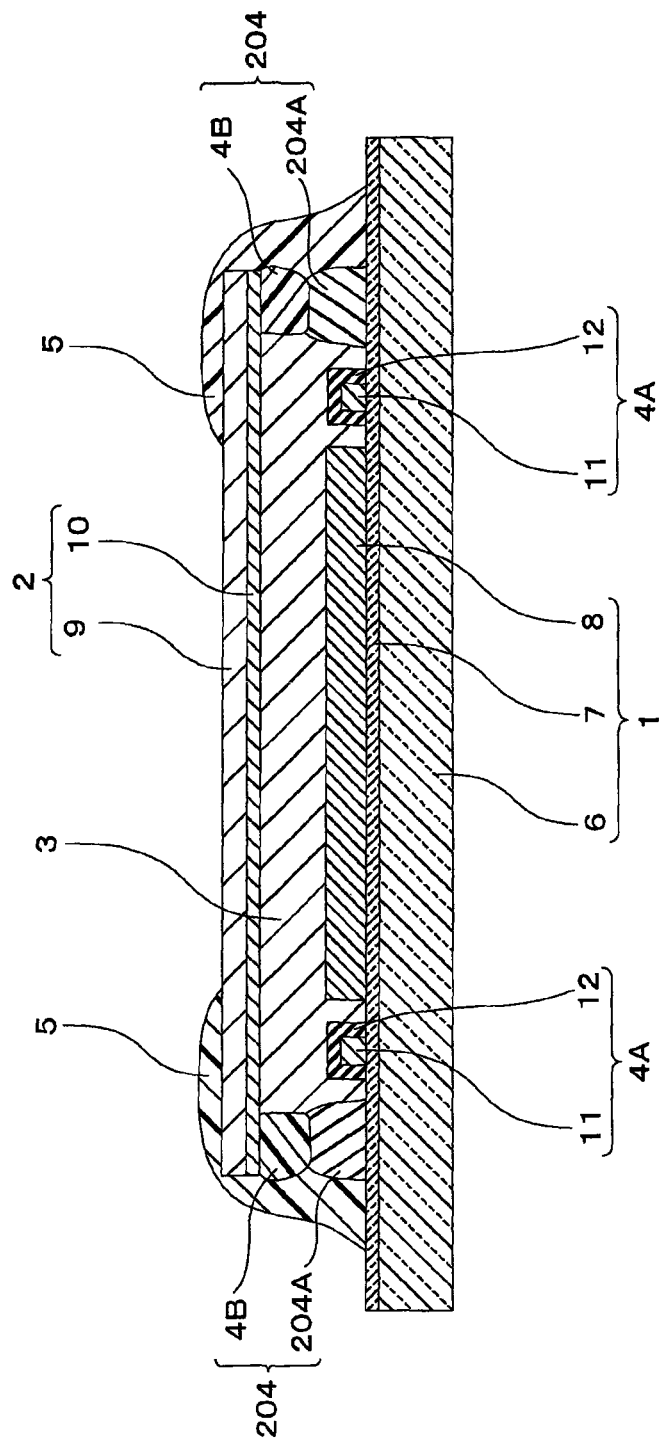
FIG. 3 is a cross-sectional view illustrating the second embodiment of the photoelectric conversion device in accordance with the present invention.

The second embodiment of the photoelectric conversion device in accordance with the present invention will be explained below with reference to FIGS. 3 and 4. In FIGS. 3 and 4, constituent elements identical or similar to those of the first embodiment will be assigned with same reference numerals and explanation thereof will be herein omitted.

FIG. 3 is a cross-sectional view of the photoelectric conversion device of the present embodiment. FIG. 4 is a partial enlarged view of FIG. 3. As shown in FIG. 3, the photoelectric conversion device 200 of the present embodiment is different from the photoelectric conversion device 100 of the first embodiment in that an inorganic sealing portion 204A is used instead of the wiring portion 4A, the wiring portion 4A is disposed between a sealing portion 204 and the semiconductor portion 8 on the surface of the transparent conductive layer 7 of the working electrode 1, and the inorganic sealing portion 204A is constituted by an inorganic insulating material and does not have the current-collecting wiring 11. Herein, the inorganic sealing portion 204A and the resin sealing portion 4B are disposed in a row along the direction connecting the working electrode 1 and the counter electrode 2, in the same manner as in the first embodiment.

Even in this case, the inorganic sealing portion 204A also has sealing ability with respect to the electrolytic solution 3 that is higher than that of the resin sealing portion 4B and therefore variations in photoelectric conversion efficiency with time can be sufficiently inhibited. Further, the inorganic sealing portion 204A is not restricted by the current-collecting wiring 11. Therefore, as shown in FIG. 4, it is possible to make a width $W_1$ of the inorganic sealing portion 204A narrower than a width $W_2$ of the wiring portion (current-collecting portion) 4A constituted by the current-collecting wiring 11 and the wiring protection layer 12. As a result, the light-receiving surface area of the photoelectric conversion device 200, that is, the aperture ratio, can be further increased. Herein, the width means a width along the surface of the transparent conductive layer 7 on the side facing the counter electrode 2. Further, in the photoelectric conversion device 200 of the present embodiment, the current-collecting wiring 11 is disposed on the inside of the sealing portion 4.

The inorganic sealing portion 204A is constituted by an inorganic material. For example, an inorganic insulating material similar to that of the wiring protection layer 12 can be used as the aforementioned inorganic material.

The inorganic sealing portion 204A can be formed on the working electrode 1 for example by a method similar to that used to form the wiring protection layer 12.

The present embodiment is especially effective when the counter electrode 2 is a thin flexible material such as a metal foil. Thus, when the counter electrode 2 is constituted by a flexible material such as a metal foil, where the resin sealing portion 4B, rather than the inorganic sealing portion 204A, is fixed to the counter electrode 2, the resin sealing portion 4B follows the deformation of the counter electrode 2 more easily than the inorganic sealing portion 204A. As a result, cracks are unlikely to occur in the inorganic sealing portion 204A and the resin sealing portion 4B is unlikely to peel off from the counter electrode 2.

Further, in the present embodiment, the third resin 13 covering the wiring protection layer 12 is omitted, but from the standpoint of preventing reliably the contact of the current-collecting wiring 11 and the electrolytic solution 3 and preventing the appearance of dissolved components of the wiring protection layer 12 caused by the electrolytic solution 3, it is preferred that the wiring protection layer 12 be covered by the third resin 13.

Third Embodiment

Figure 5:
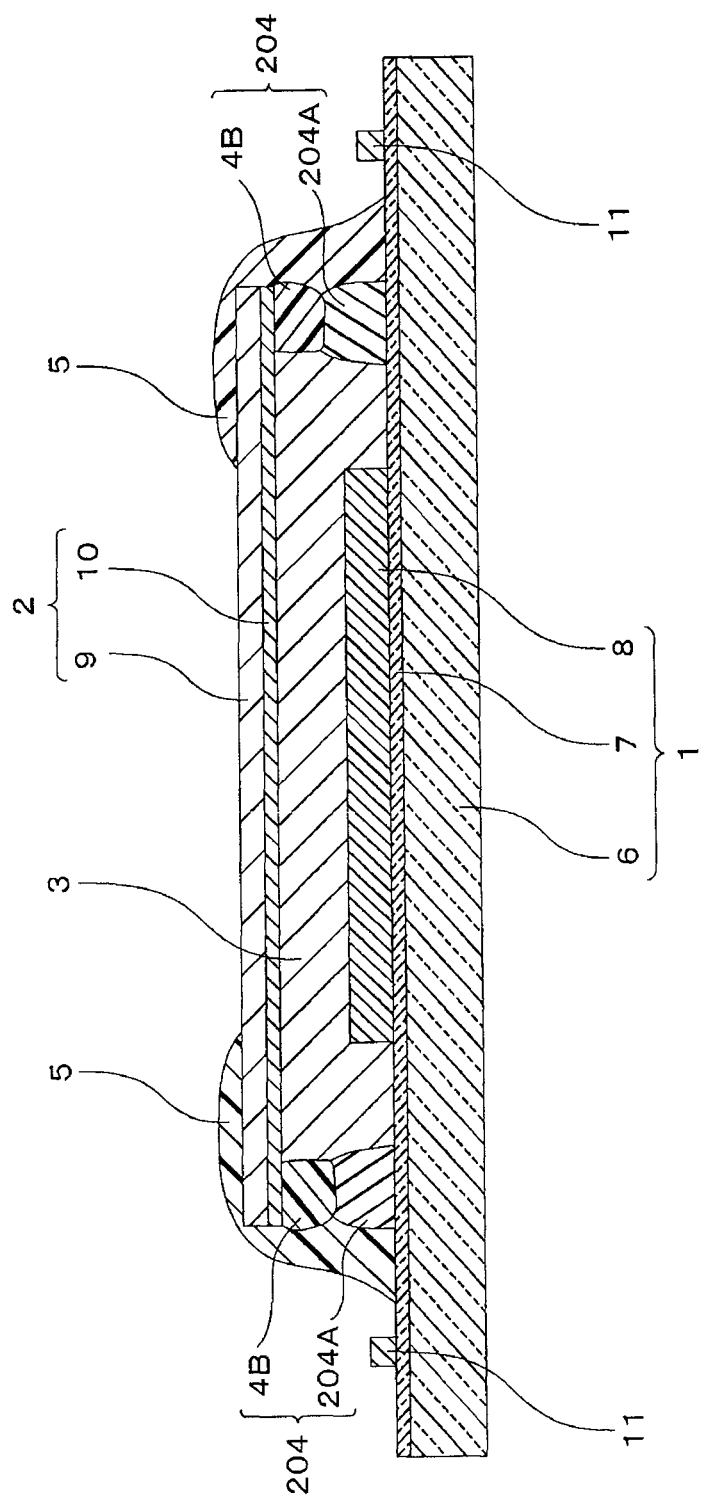
FIG. 5 is a cross-sectional view illustrating the third embodiment of the photoelectric conversion device in accordance with the present invention.

The third embodiment of the photoelectric conversion device in accordance with the present invention will be explained below with reference to FIG. 5. In FIG. 5, constituent elements identical or similar to those of the first and second embodiments will be assigned with same reference numerals and explanation thereof will be herein omitted.

FIG. 5 is a cross-sectional view of the photoelectric conversion device of the present embodiment. As shown in FIG. 5, the photoelectric conversion device 300 of the present embodiment is different from the photoelectric conversion device 200 of the second embodiment in that the current-collecting wiring 11 is disposed on the side of the sealing portion 204 opposite that facing the semiconductor portion 8.

Even in this case, the inorganic sealing portion 204A also has sealing ability with respect to the electrolytic solution 3 that is higher than that of the resin sealing portion 4B and therefore variations in photoelectric conversion efficiency with time can be sufficiently inhibited. Further, the inorganic sealing portion 204A is not restricted by the current-collecting wiring 11. Therefore, it is possible to make the width of the inorganic sealing portion 204A narrower than the width of the current-collecting portion constituted by the current-collecting wiring 11 and the wiring protection layer 12. As a result, the light-receiving surface area of the photoelectric conversion device 300, that is, the aperture ratio, can be further increased. Herein, the width means a width along the surface of the transparent conductive layer 7 on the side facing the counter electrode 2. Further, in the photoelectric conversion device 300 of the present embodiment, the current-collecting wiring 11 is disposed on the side of the sealing portion 4 opposite that facing the semiconductor portion 8. Therefore, the current-collecting wiring 11 does not come into contact with the electrolytic solution 3. As a result, it is not necessary to protect the current-collecting wiring 11 and the wiring protection layer 12 and the third resin 13 become unnecessary.

In the present embodiment, it is similar to the second embodiment that the photoelectric conversion device is particularly effective when the counter electrode 2 is a thin flexible material such as a metal foil.

Fourth Embodiment

Figure 6:
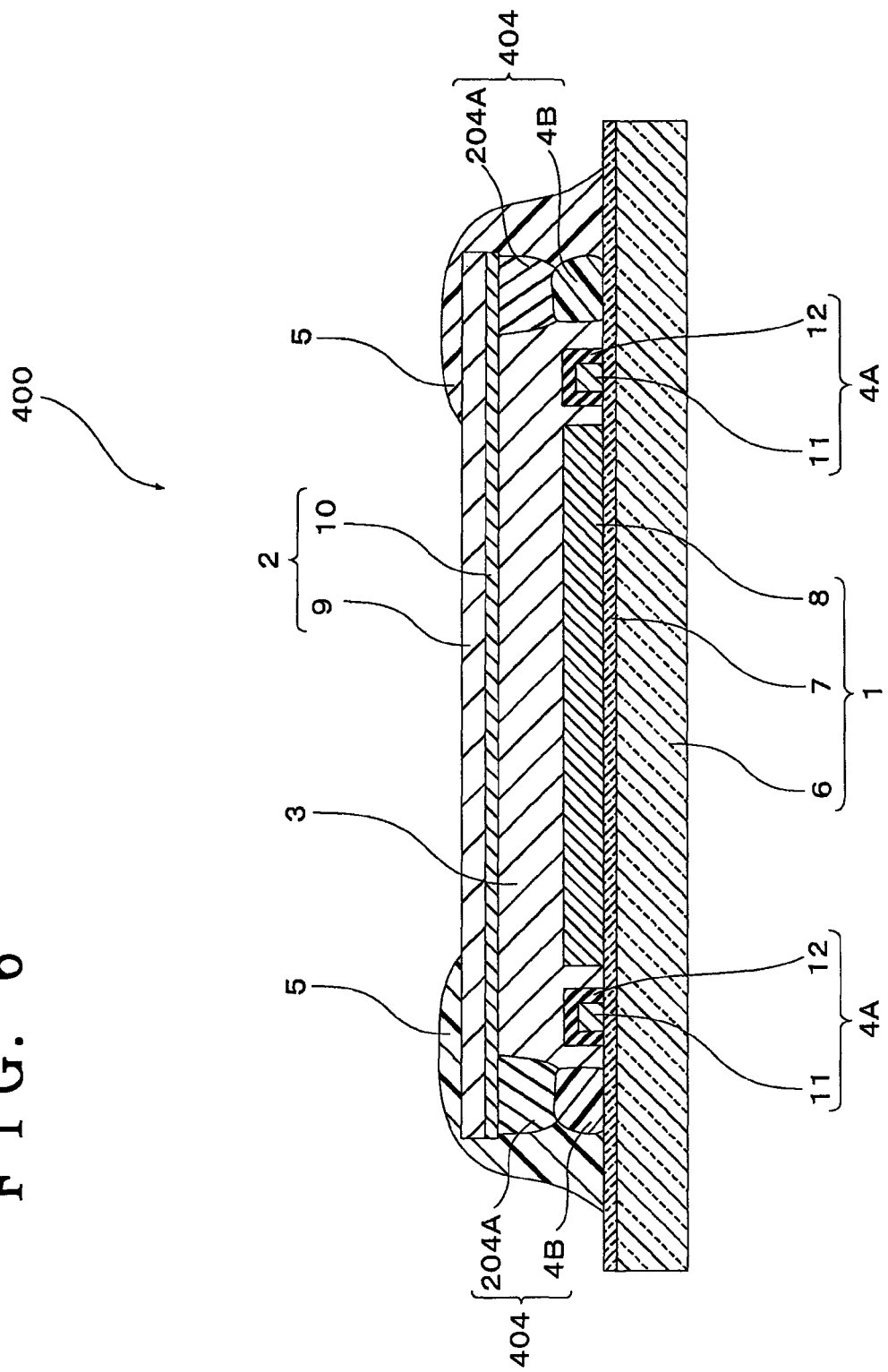
FIG. 6 is a cross-sectional view illustrating the fourth embodiment of the photoelectric conversion device in accordance with the present invention.

Next, the fourth embodiment of the photoelectric conversion device in accordance with the present invention will be explained below with reference to FIG. 6. In FIG. 6, constituent elements identical or similar to those of the first and second embodiments will be assigned with same reference numerals and explanation thereof will be herein omitted.

FIG. 6 is a cross-sectional view of the photoelectric conversion device of the present embodiment. As shown in FIG. 6, the photoelectric conversion device 400 of the present embodiment is different from the photoelectric conversion device 200 of the second embodiment in that the arrangement of the inorganic sealing portion 204A and the resin sealing portion 4B constituting a sealing portion 404 is reversed. Thus, in the photoelectric conversion device 400, the inorganic sealing portion 204A is brought into contact with and fixed to the counter electrode 2, and the resin sealing portion 4B is brought into contact with and fixed to the transparent conductive layer 7 of the working electrode 1. Herein, the inorganic sealing portion 204A and the resin sealing portion 4B are disposed in a row along the direction connecting the working electrode 1 and the counter electrode 2, in the same manner as in the second embodiment.

Even in this case, the inorganic sealing portion 204A also has sealing ability with respect to the electrolytic solution 3 that is higher than that of the resin sealing portion 4B and therefore variations in photoelectric conversion efficiency with time can be sufficiently inhibited. Further, the inorganic sealing portion 204A is not restricted by the current-collecting wiring 11. Therefore, it is possible to make the width of the inorganic sealing portion 204A narrower than the width of the wiring portion (current-collecting portion) 4A constituted by the current-collecting wiring 11 and the wiring protection layer 12. As a result, the light-receiving surface area, that is, the aperture ratio, can be further increased.

The photoelectric conversion 400 of the present embodiment is particularly effective when the working electrode 1 is a flexible material such as a resin provided with a transparent conductive film, that is, when the transparent substrate 6 is constituted by a resin in the working electrode 1. Thus, when the working electrode 1 is constituted by a flexible material such as a resin provided with a transparent conductive film, where the resin sealing portion 4B, rather than the inorganic sealing portion 204A, is fixed to the working electrode 1, the resin sealing portion 4B follows the deformation of the working electrode 1 more easily than the inorganic sealing portion 204A. As a result, the resin sealing portion 4B is unlikely to peel off from the working electrode 1.

In the case in which the first resin constituting the resin sealing portion 4B is constituted by a resin cured by ultraviolet ray, when irradiation with ultraviolet ray is performed from the working electrode 1 side in the process of manufacturing the photoelectric conversion device 400, it is possible to irradiate a ultraviolet curable resin which is a precursor of the first resin with a ultraviolet ray without being hindered by the current-collecting wiring 11. Therefore, the sealing ability of the resin sealing portion 4B can be improved.

Fifth Embodiment

Figure 7:
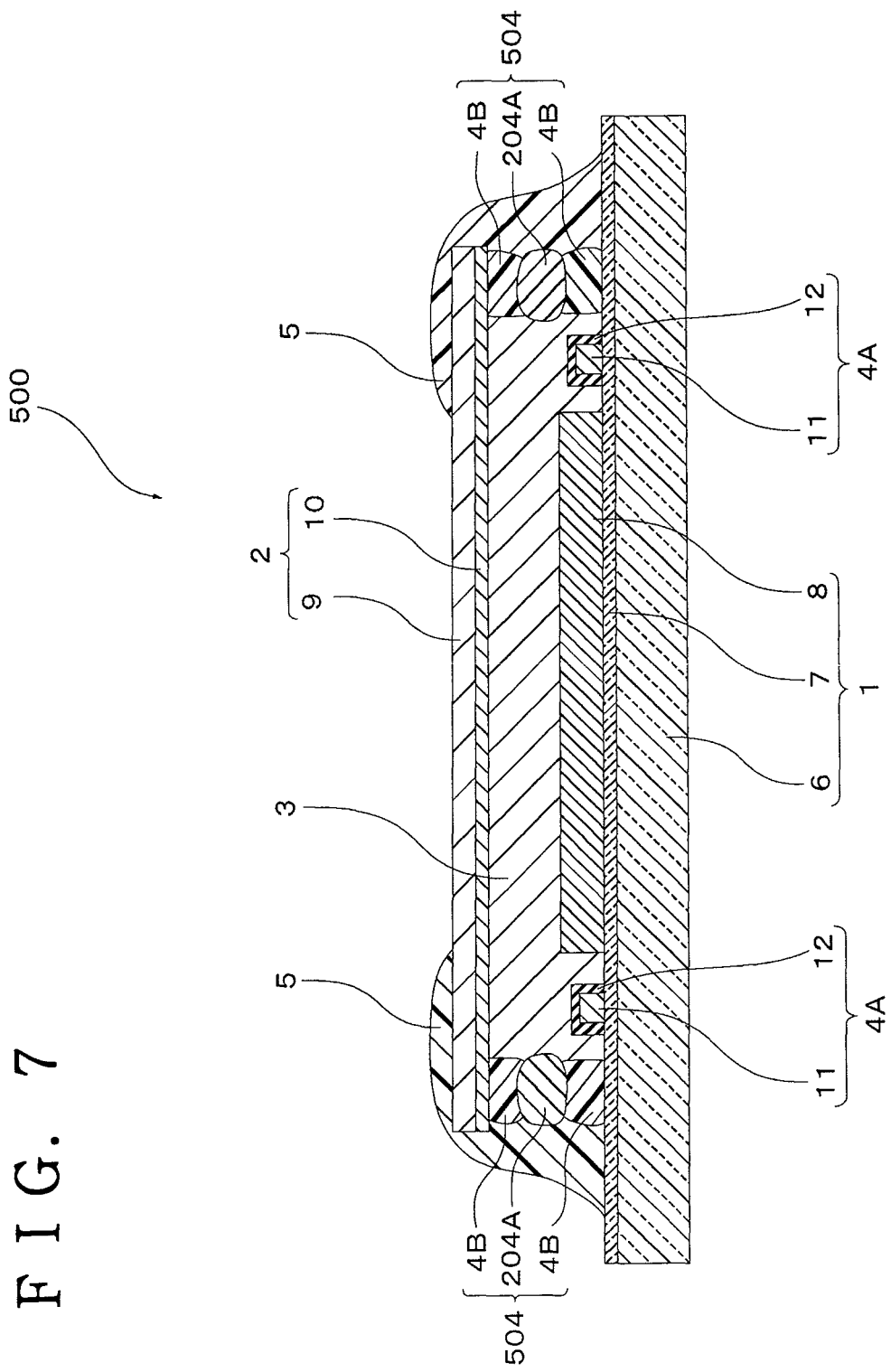
FIG. 7 is a cross-sectional view illustrating the fifth embodiment of the photoelectric conversion device in accordance with the present invention.

Next, the fifth embodiment of the photoelectric conversion device in accordance with the present invention will be explained below with reference to FIG. 7. In FIG. 7, constituent elements identical or similar to those of the first and second embodiments will be assigned with same reference numerals and explanation thereof will be herein omitted.

FIG. 7 is a cross-sectional view of the photoelectric conversion device of the present embodiment. As shown in FIG. 7, the photoelectric conversion device 500 of the present embodiment is different from the photoelectric conversion device 200 of the second embodiment in that a sealing portion 504 is further provided with the resin sealing portion 4B, which links the inorganic sealing portion 204A and the catalyst layer 10 of the counter electrode 2, between the counter electrode 2 and the inorganic sealing portion 204A. Herein, the resin sealing portion 4B, inorganic sealing portion 204A, and resin sealing portion 4B are disposed in a row along the direction connecting the working electrode 1 and the counter electrode 2, and the resin sealing portion and the inorganic sealing portion are disposed alternately.

Even in this case, the sealing ability of the of the inorganic sealing portion 204A with respect to the electrolytic solution 3 is also higher than that of the resin sealing portion 4B. Therefore, variations in photoelectric conversion efficiency with time can be sufficiently inhibited.

The sealing portion 504 can be obtained, for example, in the following manner. Thus, the first resin or a precursor thereof is formed around the wiring portion (current-collecting portion) 4A constituted by the current-collecting wiring 11 and the wiring protection layer 12 in the working electrode 1. When the first resin is a thermoplastic resin, the first resin can be formed by coating the molten first resin on the transparent conductive layer 7 of the working electrode 1 and then cooling naturally at room temperature, or by bringing a film-like first resin into contact with the transparent conductive layer 7 of the working electrode 1, heating and melting the film-like first resin by an external heat source, and then cooling naturally at room temperature. When the first resin is a resin cured by ultraviolet ray, the ultraviolet curable resin, which is a precursor of the first resin, is coated on the transparent conductive layer 7 of the working electrode 1 to form the precursor of the first resin. When the first resin is a water-soluble resin, the first resin is formed by coating an aqueous solution including the first resin on the transparent conductive layer 7 of the working electrode 1. The inorganic sealing portion 204A is then placed on the first resin formed in the above-described manner. Next, when the first resin is a thermoplastic resin, the first resin is heated and melted and the inorganic sealing portion 204A and the working electrode 1 are bonded together. The resin sealing portion 4B linking the inorganic sealing portion 204A and the working electrode 1 is thus obtained therebetween. When the first resin is a resin cured by ultraviolet ray, after a laminated body is formed, that is, after the inorganic sealing portion 204A is placed on the first resin, the above-mentioned ultraviolet curable resin is cured by ultraviolet ray and the resin sealing portion 4B linking the inorganic sealing portion 204A and the working electrode 1 is obtained therebetween. When the first resin is a water-soluble resin, after a laminated body is formed, that is, after the inorganic sealing portion 204A is placed on the first resin, finger-touch drying is conducted at room temperature, then drying is performed under low-humidity atmosphere, and the resin sealing portion 4B linking the inorganic sealing portion 204A and the working electrode 1 is obtained therebetween.

Meanwhile, the first resin or a precursor thereof is formed on the catalyst layer 10 of the counter electrode 2. The first resin or a precursor thereof can be formed similarly to the resin sealing portion 4B formed on the transparent conductive layer 7 of the working electrode 1. The working electrode 1 and the counter electrode 2 are then disposed opposite each other, the first resin and the inorganic sealing portion 204A are superimposed, and the inorganic sealing portion 204A and the counter electrode 2 are then bonded together in the same manner as in the case in which the resin sealing portion 4B formed on the transparent conductive layer 7 of the working electrode 1 and the inorganic sealing portion 204A are bonded together. As a result, the resin sealing portion 4B is obtained. The sealing portion 504 is thus obtained.

Sixth Embodiment

Figure 8:
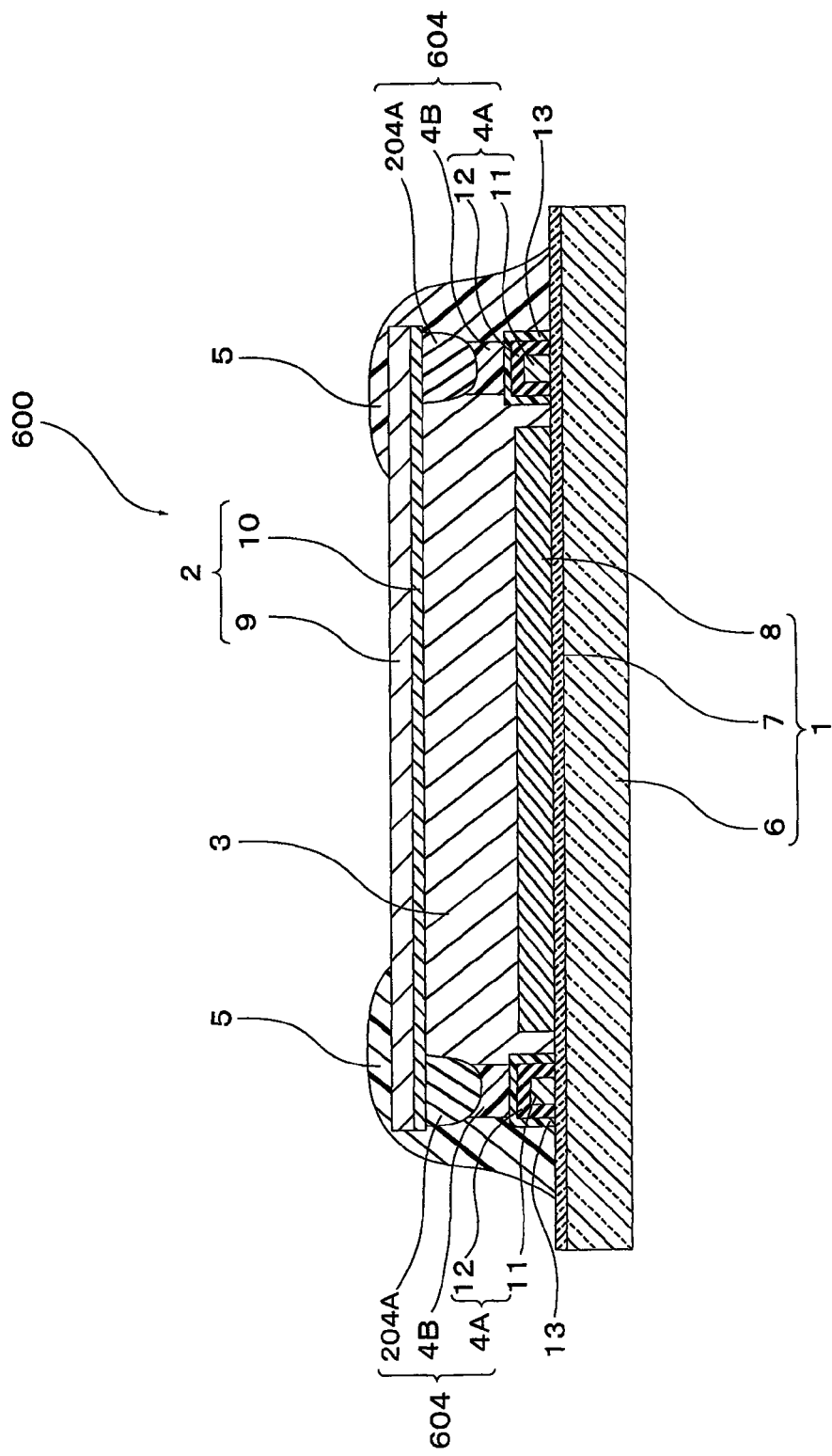
FIG. 8 is a cross-sectional view illustrating the sixth embodiment of the photoelectric conversion device in accordance with the present invention.

The sixth embodiment of the photoelectric conversion device in accordance with the present invention will be explained below with reference to FIG. 8. In FIG. 8, constituent elements identical or similar to those of the first and second embodiments will be assigned with same reference numerals and explanation thereof will be herein omitted.

FIG. 8 is a cross-sectional view of the photoelectric conversion device of the present embodiment. As shown in FIG. 8, the photoelectric conversion device 600 of the present embodiment is different from the photoelectric conversion device 100 of the first embodiment in that a sealing portion 604 further includes the inorganic portion 204A between the counter electrode 2 and the resin sealing portion 4B. Herein, the wiring portion 4A, resin sealing portion 4B, and inorganic sealing portion 204A, are disposed in a row along the direction connecting the working electrode 1 and the counter electrode 2, and the inorganic sealing portion and the resin sealing portion are disposed alternately.

Even in this case, the sealing ability of the wiring portion 4A and the inorganic sealing portion 204A with respect to the electrolytic solution 3 is also higher than that of the resin sealing portion 4B. Therefore, variations in photoelectric conversion efficiency with time can be sufficiently inhibited.

The sealing portion 604 can be obtained, for example, in the following manner. Thus, the wiring portion 4A is formed in the same manner as in the first embodiment on the transparent conductive layer 7 of the working electrode 1 and the first resin is formed on the wiring protection layer 12. The formation of the first resin may be performed in the same manner as in the case in which the first resin is formed on the transparent conductive layer 7 of the working electrode 1 in the fifth embodiment.

Meanwhile, the inorganic sealing portion 204A is formed on the catalyst layer 10 of the counter electrode 2. The formation method thereof may be performed in the same manner as that in the case in which the inorganic sealing portion 204A is formed on the working electrode 1 in the second embodiment.

The working electrode 1 and the counter electrode 2 are then disposed opposite each other, the first resin and the inorganic sealing portion 204A are superimposed, and the inorganic sealing portion 204A and the counter electrode 2 are then bonded together in the same manner as in the case in which the first resin and the inorganic sealing portion 204A are bonded together in the fifth embodiment. As a result, the resin sealing portion 4B is obtained. The sealing portion 604 is thus obtained.

Seventh Embodiment

Figure 9:
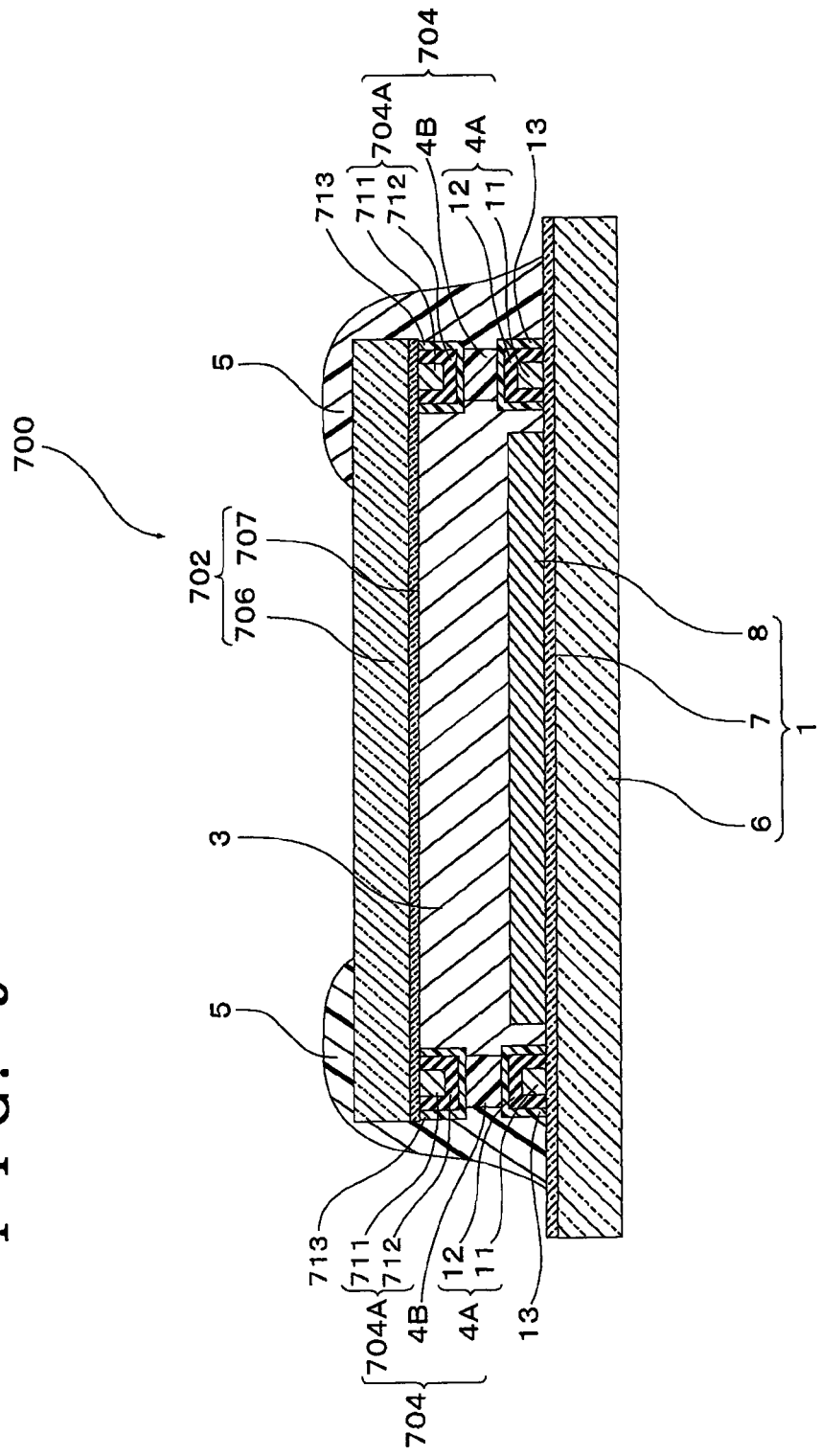
FIG. 9 is a cross-sectional view illustrating the seventh embodiment of the photoelectric conversion device in accordance with the present invention.

Next, the seventh embodiment of the photoelectric conversion device in accordance with the present invention will be explained below with reference to FIG. 9. In FIG. 9, constituent elements identical or similar to those of the first and sixth embodiments will be assigned with same reference numerals and explanation thereof will be herein omitted.

FIG. 9 is a cross-sectional view of the photoelectric conversion device of the present embodiment. As shown in FIG. 9, the photoelectric conversion device 700 of the present embodiment is different from the photoelectric conversion device 100 of the first embodiment in that the counter electrode 702 has a transparent substrate 706 and a transparent conductive layer 707 provided on the side of the transparent substrate 706 facing the working electrode 1 and in that a sealing portion 704 is further provided with a second wiring portion 704A between a counter electrode 702 and the resin sealing portion 4B. In the present embodiment, both the working electrode 1 and the counter electrode 702 are transparent electrodes. Herein, the wiring portion 4A, resin sealing portion 4B, and second wiring portion 704A are disposed in a row along the direction connecting the working electrode 1 and the counter electrode 702, and the resin sealing portion 4B links the wiring portion 4A and the second wiring portion 704A.

The second wiring portion 704A is provided on the surface of the transparent conductive layer 707 and provided so as to surround the semiconductor portion 8, when viewed from the side facing the counter electrode 702. The second wiring portion 704A has a second current-collecting wiring 711 and a second wiring protection layer 712. The second current-collecting wiring 711 is present inside the wiring portion 704A. The second current-collecting wiring 711 is entirely covered by the second wiring protection layer 712 and prevents the contact of the electrolytic solution 3 with the second current-collecting wiring 711. Thus, the second wiring protection layer 712 is provided to straddle the second current-collecting wiring 711. The second wiring protection layer 712 may or may not be in contact with the transparent conductive layer 707, as long as the second wiring protection layer covers the entire second current-collecting wiring 711.

In such photoelectric conversion device 700, the working electrode 1 and the counter electrode 702 are transparent electrodes. Therefore, the semiconductor portion 8 can receive light both at the side facing the working electrode 1 and at the side facing the counter electrode 702 and the photoelectric conversion efficiency can be further increased. Further, since the second current-collecting wiring 711 is disposed as part of the sealing portion 704 inside the sealing portion 704, the incident light blocked by the second current-collecting wiring 711 and the sealing portion 704 can be minimized even on the light incidence surface of the counter electrode 702 and the photoelectric conversion efficiency can be further increased.

The transparent substrate 706 of the counter electrode 702 can be constituted, for example, from a transparent material similar to that of the transparent substrate 6. The transparent conductive layer 707 can be constituted, for example, by a material similar to that of the transparent conductive layer 7.

The material constituting the current-collecting wiring 711 is similar to the material constituting the current-collecting wiring 11. The material constituting the wiring protection layer 712 is similar to the material constituting the wiring protection layer 12.

The transparent conductive layer 707 may be provided on the transparent substrate 706 similarly to the case in which the transparent conductive layer 7 is formed on the transparent substrate 6 in the first embodiment.

The sealing portion 704 can be obtained, for example, in the following manner. Thus, the current-collecting wiring 11 and the wiring protection layer 12 are formed on the transparent conductive layer 7 of the working electrode 1 in the same manner as in the first embodiment, and the first resin is formed on the wiring protection layer 12 in the same manner as in the second embodiment.

Meanwhile, the second wiring portion 704A is formed on the transparent conductive layer 707 of the counter electrode 702. The second wiring portion 704A may be formed in the same manner in which the wiring portion 4A is formed on the transparent conductive layer 7 in the first embodiment. In this case, it is also preferred that the second wiring protection layer 712 be covered by a third resin 713 constituted by a material similar to that of the third resin 13. The second wiring protection layer 712 may be covered with the third resin 713 in the same manner as the case in which the wiring protection layer 12 is covered with the third resin 13.

The working electrode 1 and the counter electrode 702 are then disposed opposite each other, the first resin and the second wiring portion 704A are superimposed, and the first resin and the second wiring portion 704A are bonded together in the same manner as the case in which the first resin and the inorganic sealing portion 204A are bonded together in the second embodiment. As a result, the resin sealing portion 4B is obtained. The sealing portion 704 is thus obtained.

Eighth Embodiment

Figure 10:
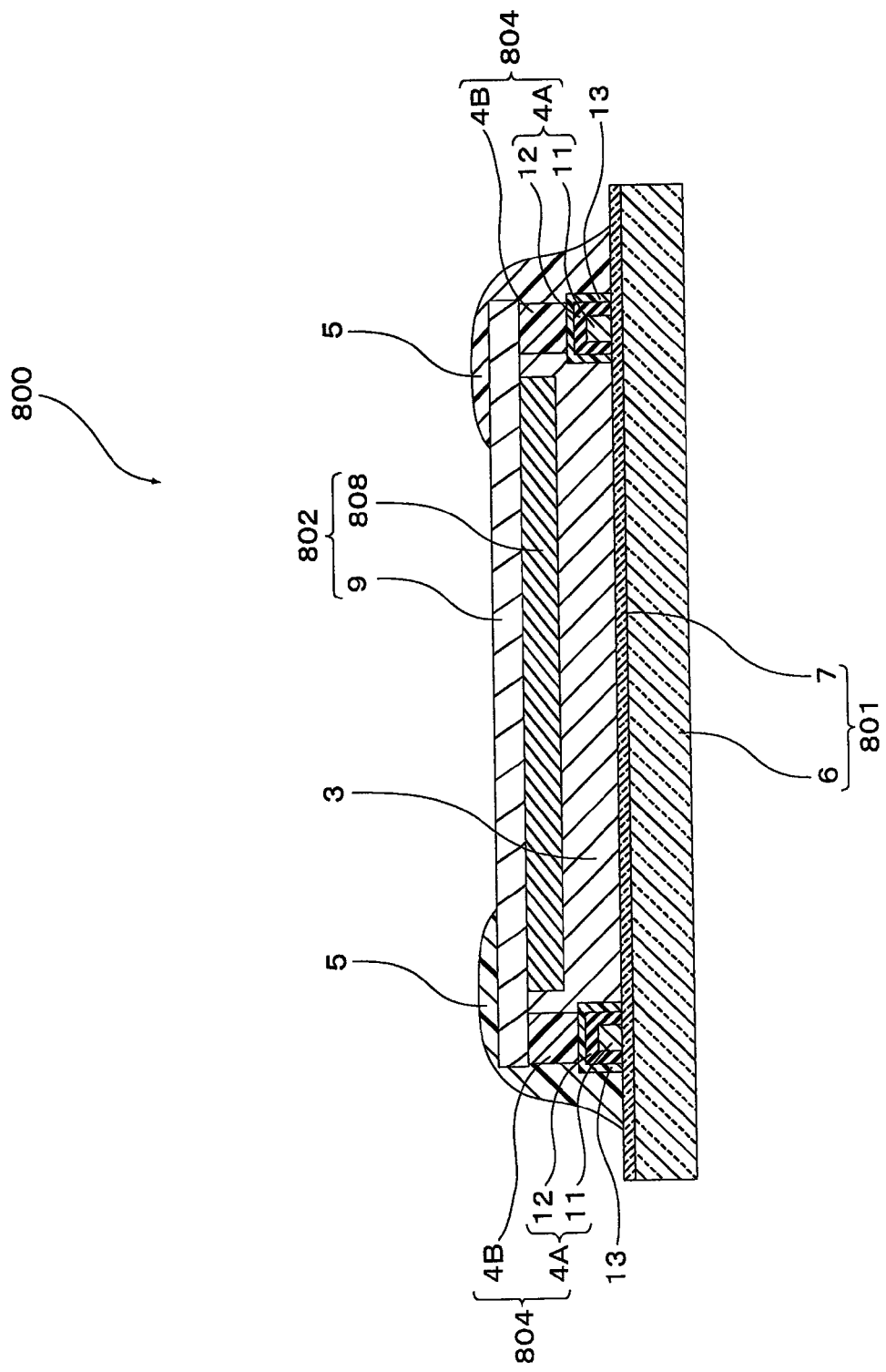
FIG. 10 is a cross-sectional view illustrating the eighth embodiment of the photoelectric conversion device in accordance with the present invention.

Next, the eighth embodiment of the photoelectric conversion device in accordance with the present invention will be explained below with reference to FIG. 10. In FIG. 10, constituent elements identical or similar to those of the first embodiment will be assigned with same reference numerals and explanation thereof will be herein omitted.

FIG. 10 is a cross-sectional view of the photoelectric conversion device of the present embodiment. As shown in FIG. 10, the photoelectric conversion device 800 of the present embodiment is provided with a counter electrode 801, which is a transparent electrode, and a working electrode 802 disposed so as to face the counter electrode 801. The working electrode 802 supports a photosensitizing dye. The electrolytic solution 3 is disposed between the counter electrode 801 and the working electrode 802, and a sealing portion 804 is provided between the counter electrode 801 and the working electrode 802 around the electrolytic solution 3.

The counter electrode 801 is provided with the transparent substrate 6 and the transparent conductive layer 7 provided on the side of the transparent substrate 6 that faces the working electrode 802.

The working electrode 802 is provided with the conductive layer 9 and a semiconductor portion 808 as a photoelectric conversion portion provided on the conductive layer 9. The photosensitizing dye is supported on the semiconductor portion 808. The semiconductor portion 808 has a semiconductor layer configured in the same manner as the semiconductor portion 8 in the first embodiment and is in contact with the electrolytic solution 3.

The sealing portion 804 links the counter electrode 801 and the working electrode 802 and is provided with the wiring portion 4A fixed on the surface of the counter electrode 801 on the side facing the working electrode 802 and the resin sealing portion 4B linking the wiring portion 4A and the working electrode 802. The wiring portion 4A and the resin sealing portion 4B are arranged in a row along the direction from the counter electrode 801 to the working electrode 802.

The photoelectric conversion device 800 can be manufactured in the following manner.

First, the counter electrode 801 and the working electrode 802 are prepared.

The counter electrode 801 can be obtained by forming the transparent conductive layer 7 on the transparent substrate 6.

Then, the wiring portion 4A is provided on the counter electrode 801. The wiring portion 4A may be formed in the same manner as the case in which the wiring portion 4A is formed on the working electrode 1 in the first embodiment.

Meanwhile, in the working electrode 802, the semiconductor portion 808 is formed on the conductive layer 9. The semiconductor portion 808 may be formed in the same manner as the case in which the semiconductor portion 8 is formed on the transparent conductive layer 7 in the first embodiment.

The photosensitizing dye is then supported on the semiconductor portion 808 of the working electrode 802. The photosensitizing dye may be supported in the same manner as the case in which the photosensitizing dye is supported on the semiconductor portion 8 in the first embodiment.

Then, the first resin or a precursor thereof for linking the wiring portion 4A and the working electrode 802 is formed on the working electrode 802. The first resin or a precursor thereof may be formed in the same manner as the case in which the first resin or a precursor thereof is formed on the counter electrode 2 in the first embodiment.

The counter electrode 801 and the working electrode 802 are then disposed opposite each other, the first resin and the wiring portion 4A are superimposed to form a laminated body, and the resin sealing portion 4B linking the wiring portion 4A and the working electrode 802 is formed therebetween. The resin sealing portion 4B may be formed in the same manner in which the resin sealing portion 4B is formed in the first embodiment.

Then, the space surrounded by the counter electrode 801, working electrode 802, and sealing portion 804 is filled with the electrolytic solution 3. Filling with the electrolytic solution 3 may be performed in the same manner as the case in which the space is filled with the electrolytic solution 3 in the first embodiment.

The subsequent operations are similar to those of the first embodiment. The production of the photoelectric conversion device 800 is thus completed.

The present invention is not limited to the above-described embodiments. For example, only one semiconductor portion 8 or semiconductor portion 808 is used in the above-described first to eighth embodiments, but a plurality of semiconductor portions 8 or semiconductor portions 808 may be also used. In this case, the current-collecting wiring 11 has, for example, a grid-like or a comb-like shape. In the first, second, and fourth to eighth embodiments, the current-collecting wiring 11 is covered by a wiring protection layer 12. In the first and sixth embodiments, the portion of the wiring portion (constituted by the current-collecting wiring 11 and the wiring protection layer 12) that encloses the entire semiconductor portion 8 is the inorganic sealing portion as referred to in the present invention. In the second and third embodiments, the inorganic sealing portion 204A is provided so as to enclose the entire semiconductor portion 8.

In the second to fifth embodiments, the third resin 13 is not introduced between the inorganic sealing portion 204A and the resin sealing portion 4B, but the third resin 13 may be introduced between the inorganic sealing portion 204A and the resin sealing portion 4B so as to cover the inorganic sealing portion 204A in order to prevent the contact between the inorganic sealing portion 204A and the electrolytic solution 3 and the appearance of dissolved components of the inorganic sealing portion 204A caused by the electrolytic solution 3.

In the above-described embodiments, the inorganic sealing portion 204A is constituted by the inorganic insulating material, but the inorganic sealing portion 204A is not necessarily limited to the inorganic insulating material and may be constituted by a conductive oxide such as ITO and FTO or an inorganic conductive material such as a metal material, for example Ti, that is not corroded by the electrolytic solution 3.

Further, in the first to eighth embodiments, the sealing portion comprises two or less inorganic sealing portions and two or less resin sealing portions, but the sealing portion may comprise three or more inorganic sealing portions and three or more resin sealing portions.

Figure 11:
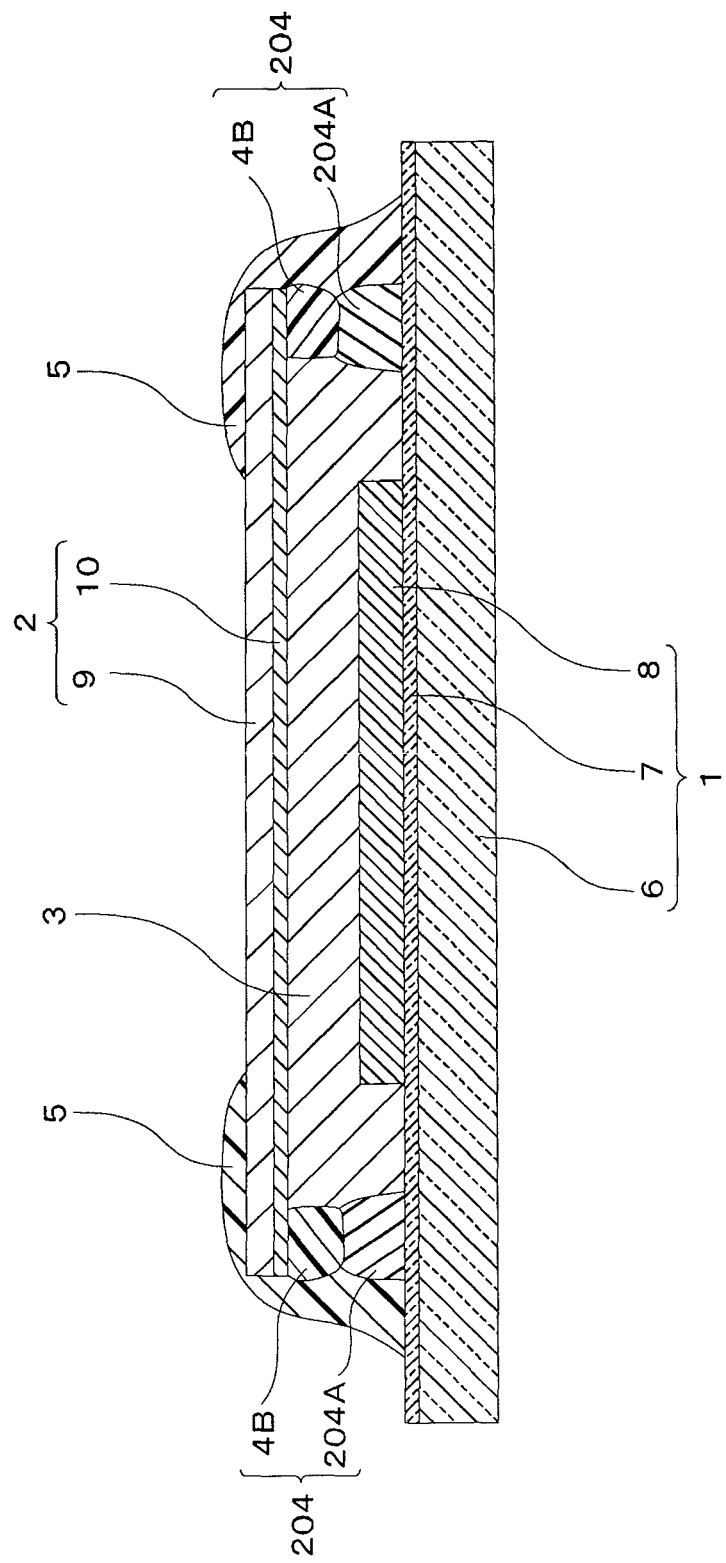
FIG. 11 is a cross-sectional view illustrating the ninth embodiment of the photoelectric conversion device in accordance with the present invention.

Further, in the second and third embodiments, the wiring portion 4A can be omitted, as shown in FIG. 11. The wiring portion 4A can be also omitted in the fourth and fifth embodiments although such configurations are not shown in the figures.

It goes without saying that the position of the current-collecting wiring 11 is not limited to those in the first to eighth embodiments and may be different therefrom.

Further, in the first embodiment, the wiring portion 4A and the resin sealing portion 4B are arranged in a row along the direction connecting the working electrode 1 and the counter electrode 2, but the wiring portion and sealing portion may be also disposed in two rows. Thus, another sealing portion (will be referred to hereinbelow as an "external sealing portion") may be further provided outside the sealing portion 4 and between the working electrode 1 and the counter electrode 2 so as to enclose the sealing portion 4. In this case, the sealing capability and adhesive bonding capability can be further improved. The external sealing portion is also provided with an inorganic sealing portion and a resin sealing portion, and the inorganic sealing portion and resin sealing portion are disposed in a row along the direction connecting the working electrode 1 and the counter electrode 2. In this case, it is preferred that the inorganic sealing portion in the external sealing portion be fixed to the counter electrode 2 and that the resin sealing portion be fixed to the working electrode 1 side. It is further preferred that the inorganic sealing portion of the external sealing portion be fixed to the resin sealing portion 4B of the sealing portion 4 and that the resin sealing portion of the external sealing portion be fixed to the wiring portion 4A of the sealing portion 4. In this case, sealing capability and adhesive bonding capability can be greatly improved and the mechanical strength of the photoelectric conversion device can be also improved.

Further, in the first and sixth to eighth embodiments, the wiring portion 4A having the current-collecting wiring 11 and the wiring protection layer 12 is provided so as to enclose the semiconductor portion 8, but the wiring portion 4A may be provided along the sealing portion 4 in part of the sealing portion 4. In this case, the sealing portion 4 is constituted by a first portion where the wiring portion 4A having the current-collecting wiring 11 is present and a second portion where the current-collecting wiring 11 is not present (that is, where the wiring portion 4A is not present). Herein, in the second portion of the sealing portion 4 where the wiring portion 4A is not present, the inorganic sealing portion composed of an inorganic material and having no current-collecting wiring 11 and the resin sealing portion 4B may be configured to be disposed in a row along the direction connecting the working electrode 1 and the counter electrode 2. In this case, the inorganic sealing portion may be constituted, for example, only by the wiring protection layer 12. Herein, the wiring portion 4A and the inorganic sealing portion have sealing ability higher than that of the resin sealing portion 4B. Therefore, the cross-section area of the wiring portion 4A through which the electrolytic solution 3 can leak is reduced in the same manner as the case in which the wiring portion is provided over the entire sealing portion 4. As a result, variations in photoelectric conversion device with time can be sufficiently inhibited. Herein, the width of the second portion is preferably narrower than that of the first portion. In this case, the light-receiving surface area, that is aperture ratio, of the photoelectric conversion device can be further increased.

Alternatively, when the wiring portion 4A is present only in part of the sealing portion 4, the second portion of the sealing portion 4 where the wiring portion 4A is not present may be constituted only by the resin sealing portion 4B.

Further, in the seventh embodiment, the second wiring portion 704A having the current-collecting wiring 711 and the wiring protection layer 712 is provided so as to enclose the semiconductor portion 8, as viewed from the counter electrode 702 side, but the wiring portion 704A may be also provided inside the sealing portion 704 along the sealing portion 4 in part of the sealing portion 4.

Further, in the eighth embodiment, the sealing portion 804 includes the wiring portion 4A and the resin sealing portion 4B, and the counter electrode 801 and the working electrode 802 are linked by the wiring portion 4A and the resin sealing portion 4B, but an inorganic sealing portion may be provided between the resin sealing portion 4B and the working electrode 802 and the resin sealing portion 4B nay link the wiring portion 804 and the inorganic sealing portion.

Further, in the first, sixth, and eighth embodiments, the transparent electrode is constituted by the transparent substrate 6 and the transparent conductive layer 7, and in the seventh embodiment, the transparent electrode is constituted by the transparent substrate 706 and the transparent conductive layer 707. However, the transparent electrode can be also constituted by conductive glass. In this case, the current-collecting wirings 11, 711 can be obtained, for example, by compounding particles of a metal constituting the current-collecting wiring 11, 711, a thickening agent such as polyethylene glycol, and a low-melting-point glass frit to obtain a paste, coating the paste by using a screen printing method or the like so as to surround the semiconductor portion 8, heating and calcining. In such a way, the current-collecting wirings 11, 711 can be strongly bonded to the transparent electrode.

In the first to eighth embodiments, the case is explained in which photoelectric conversion device in accordance with the present invention is applied to a dye-sensitized solar cell, but the photoelectric conversion device in accordance with the present invention can be widely applied to photoelectric conversion devices other than the dye-sensitized solar cell, as long as the photoelectric conversion device has a structure using an electrolytic solution and sealing the electrolytic solution with a sealing portion.

EXAMPLES

The contents of the present invention will be specifically explained below with reference to examples thereof, but the present invention is not limited to the below-described examples.

Example 1

A transparent conductive substrate was prepared in which a transparent conductive layer composed of FTO was formed on a glass substrate that served as a transparent substrate. A paste including titanium oxide nanoparticles was coated by a doctor blade method on the transparent conductive substrate so as to cover the transparent conductive layer and then calcining was conducted for 3 h at 150° C. to form a porous oxide semiconductor layer with a thickness of 10 μm on the transparent conductive layer and obtain a working electrode. A N719 dye was then supported on the porous oxide semiconductor layer.

A conductive layer composed of FTO similar to that used in the fabrication of the transparent conductive layer was also prepared, a thin platinum film composed of platinum was formed by sputtering on the conductive layer, and a counter electrode was obtained. Through holes were formed in two locations in the counter electrode.

A paste was then prepared by compounding 2 parts by mass of ethyl cellulose, 19 parts by mass of methanol, and 10 parts by mass of BDGA (diethylene glycol monobutyl ether acetate) with 100 parts by weight of an inorganic insulating material constituted by a low-melting-point glass frit. The paste was coated by a screen printing method on the transparent conductive layer of the working electrode obtained in the above describe manner, so as to enclose the periphery of the porous oxide semiconductor layer, and an inorganic sealing portion was then obtained by heating and calcining for 1 h at 500° C.

A thermoplastic resin with a width of 2 mm and a thickness of 50 μm that was constituted by Himilan, which is an ionomer, was then formed as the first resin on the thin platinum film of the counter electrode so as to enable superimposition on the inorganic sealing portion.

The working electrode and counter electrode were then disposed opposite each other, and the first resin and the inorganic sealing portion were superimposed so as to be in contact with each other.

A resin sealing portion was then obtained by melting the first resin by heating for 60 sec at 150° C., and a sealing portion constituted by the resin sealing portion and inorganic sealing portion was obtained between the working electrode and counter electrode to link these electrodes.

An electrolytic solution including methoxyacetonitrile as the main solvent, 0.1 M lithium iodide, 0.05 M iodine, and 0.5 M 4-tert-butyl pyridine was then prepared, the electrolytic solution was injected from the two through holes formed in the counter electrode, these through holes were sealed by using a glass plate and a sheet composed of a thermoplastic resin similar to that described hereinabove, and a laminated body subjected to primary sealing was obtained. A photoelectric conversion device composed of the laminated body subjected to primary sealing was thus obtained.

Example 2

A photoelectric conversion device was obtained in the same manner as in Example 1, except that Bynel (trade name, manufactured by Du Pont Corp.), which is polyethylene modified with maleic anhydride, was used as the thermoplastic resin constituting the resin sealing portion.

Example 3

A photoelectric conversion device was obtained in the same manner as in Example 1, except that Eval (trade name, manufactured by Kuraray Co., Ltd.), which is an ethylene-vinyl alcohol copolymer, was used as the thermoplastic resin constituting the resin sealing portion.

Example 4

A photoelectric conversion device was obtained in the same manner as in Example 1, except that a second resin (secondary sealing material) was further formed on the laminated body subjected to primary sealing obtained in Example 1, so as to cover the sealing portion from the outside.

In this case, the second resin was formed in the following specific manner. Thus, an aqueous solution was prepared by dissolving Poval (trade name, manufactured by Kuraray Co., Ltd.), which is a vinyl alcohol polymer, in pure water. Then, the aqueous solution was coated around the sealing portion so as to cover the boundary of the inorganic sealing portion and the resin sealing portion, the boundary of the inorganic sealing portion and the working electrode, and the boundary of the resin sealing portion and the counter electrode. Water which was the solvent was then naturally dried under a dry atmosphere at room temperature and the second resin composed of Poval was formed.

Example 5

A photoelectric conversion device was obtained in the same manner as in Example 4, except that Bynel, which is polyethylene modified with maleic anhydride, was used as the first resin constituting the resin sealing portion.

Example 6

A photoelectric conversion device was obtained in the same manner as in Example 4, except that Eval, which is an ethylene-vinyl alcohol copolymer, was used as the first resin constituting the resin sealing portion.

Example 7

A photoelectric conversion device was obtained in the same manner as in Example 1, except that a second resin (secondary sealing material) was further formed on the laminated body subjected to primary sealing, so as to cover the sealing portion from the outside.

In this case, the second resin was formed in the following specific manner. Thus, 31x-101 (trade name, manufactured by ThreeBond Co.), which is a UV-curable resin, was prepared. Then, the UV-curable resin was coated around the sealing portion so as to cover the boundary of the inorganic sealing portion and the resin sealing portion, the boundary of the inorganic sealing portion and the working electrode, and the boundary of the resin sealing portion and the counter electrode. The UV-curable resin was then cured by irradiating the UV-curable resin with ultraviolet ray under dry atmosphere at room temperature and the second resin constituted by the UV-cured resin was formed.

Example 8

A photoelectric conversion device was obtained in the same manner as in Example 1, except that a second resin (secondary sealing material) was further formed on the laminated body subjected to primary sealing, so as to cover the sealing portion from the outside.

In this case, the second resin was formed in the following specific manner. Thus, Nucrel (manufactured by Du Pont-Mitsui Polychemicals Co., Ltd.), which is an ethylene-methacrylic acid copolymer, was prepared. Then, the second resin was coated around the sealing portion so as to cover the boundary of the inorganic sealing portion and the resin sealing portion, the boundary of the inorganic sealing portion and the working electrode, and the boundary of the resin sealing portion and the counter electrode. The second resin was then formed by heating, melting and then naturally cooling (at room temperature) the second resin.

Example 9

A photoelectric conversion device was obtained in the same manner as in Example 8, except that Nucrel, which is an ethylene-methacrylic acid copolymer, was used as the first resin constituting the resin sealing portion.

Example 10

A photoelectric conversion device was obtained in the same manner as in Example 1, except that a second resin (secondary sealing material) was further formed on the laminated body subjected to primary sealing, so as to cover the sealing portion from the outside.

In this case, the second resin was formed in the following specific manner. Thus, Himilan, which is an ionomer, was prepared. Then, the second resin was coated around the sealing portion so as to cover the boundary of the inorganic sealing portion and the resin sealing portion, the boundary of the inorganic sealing portion and the working electrode, and the boundary of the resin sealing portion and the counter electrode. The second resin was then formed by heating, melting and then naturally cooling the second resin at room temperature.

Example 11

A laminated body subjected to primary sealing was obtained in the same manner as in Example 1 except that 31x-101, which is a UV-curable resin serving as a precursor for UV-cured resin, was coated on a thin platinum film of the counter electrode, the counter electrode and working electrode were disposed opposite each other to ensure superimposition on the inorganic sealing portion formed on the working electrode, and the UV-curable resin was cured by irradiating the UV-curable resin with ultraviolet ray. Poval, which is a vinyl alcohol polymer, was formed around the sealing portion in the same manner as in Example 4 on the laminated body subjected to primary sealing obtained in the above-described manner.

Example 12

A photoelectric conversion device was obtained in the same manner as in Example 11, except that Nucrel, which is an ethylene-methacrylic acid copolymer, was used as the second resin (secondary sealing material). In this case, Nucrel, which is an ethylene-methacrylic acid copolymer, was formed to cover the sealing portion in the same manner as in Example 8.

Example 13

A photoelectric conversion device was obtained in the same manner as in Example 11, except that the UV-cured resin was formed as the second resin (secondary sealing material) on the laminated body subjected to primary sealing. In this case, the UV-cured resin was formed in the same manner as in Example 7.

Example 14

A photoelectric conversion device was obtained in the same manner as in Example 11, except that Himilan, which is an ionomer, was formed as the second resin (secondary sealing material) on the laminated body subjected to primary sealing. In this case, Himilan, which is an ionomer, was formed in the same manner as in Example 10.

Example 15

A laminated body subjected to primary sealing was obtained in the same manner as in Example 1 except that an aqueous solution obtained by dissolving Poval, which is a vinyl alcohol polymer, in pure water was coated on a thin platinum film of the counter electrode, water that was the solvent was naturally dried under dry atmosphere at room temperature to form the first resin composed of Poval, the counter electrode and working electrode were disposed opposite each other to superimposed the first resin and the inorganic sealing portion formed on the working electrode, and the first resin was finger-touch dried at room temperature and then dried under low-humidity atmosphere to form a resin sealing portion. A photoelectric conversion device was obtained by forming the UV-cured resin around the sealing portion in the same manner as in Example 7 on the laminated body subjected to primary sealing that was obtained in the above-described manner.

Example 16

A photoelectric conversion device was obtained in the same manner as in Example 15, except that Himilan, which is an ionomer, was formed as the second resin (secondary sealing material) on the laminated body subjected to primary sealing. In this case, Himilan, which is an ionomer, was formed to cover the sealing portion in the same manner as in Example 10.

Example 17

A photoelectric conversion device was obtained in the same manner as in Example 11, except that Nucrel, which is an ethylene-methacrylic acid copolymer, was used as the second resin (secondary sealing material). In this case, Nucrel, which is an ethylene-methacrylic acid copolymer, was formed to cover the sealing portion in the same manner as in Example 8.

Example 18

A photoelectric conversion device was obtained in the same manner as in Example 15, except that Poval, which is a vinyl alcohol polymer, was used as the second resin (secondary sealing material). In this case, Poval, which is a vinyl alcohol polymer, was formed to cover the sealing portion in the same manner as in Example 4.

Comparative Example 1

A photoelectric conversion device was obtained in the same manner as in Example 1, except that the sealing portion was constituted only by the resin sealing portion, without forming the inorganic sealing portion on the transparent conductive layer of the working electrode.

Comparative Example 2

A photoelectric conversion device was obtained in the same manner as in Example 1, except that the sealing portion was constituted only by the resin sealing portion, without forming the inorganic sealing portion on the transparent conductive layer of the working electrode, and Eval, which is an ethylene-vinyl alcohol copolymer, is used as the thermoplastic resin constituting the resin sealing portion.

Comparative Example 3

A laminated body subjected to primary sealing was obtained in the same manner as in Example 1, except that the sealing portion was constituted only by the resin sealing portion, without forming the inorganic sealing portion on the transparent conductive layer of the working electrode. A photoelectric conversion device was then obtained by forming the second resin (secondary sealing material) constituted by a UV-curable resin on the laminated body subjected to primary sealing, so as to cover the sealing portion from the outside in the same manner as in Example 7.

Comparative Example 4

A laminated body subjected to primary sealing was obtained in the same manner as in Example 1, except that the sealing portion was constituted only by the resin sealing portion, without forming the inorganic sealing portion on the transparent conductive layer of the working electrode, and Eval, which is an ethylene-vinyl alcohol copolymer, was used as the thermoplastic resin constituting the resin sealing portion. A photoelectric conversion device was then obtained by forming the second resin (secondary sealing material) constituted by a UV-cured resin on the laminated body subjected to primary sealing, so as to cover the sealing portion from the outside in the same manner as in Example 7.

Comparative Example 5

A photoelectric conversion device was obtained in the same manner as in Example 4, except that the sealing portion was constituted only by the resin sealing portion, without forming the inorganic sealing portion on the transparent conductive layer of the working electrode.

Comparative Example 6

A photoelectric conversion device was obtained in the same manner as in Example 4, except that the sealing portion was constituted only by the resin sealing portion, without forming the inorganic sealing portion on the transparent conductive layer of the working electrode, and Eval, which is an ethylene-vinyl alcohol copolymer, was used as the thermoplastic resin constituting the resin sealing portion.

Photoelectric conversion capability was evaluated with respect to photoelectric conversion devices of Examples 1 to 18 and Comparative Examples 1 to 6 that were obtained in the above-described manner. The results obtained are shown in Table 1 below.

(Evaluation of Photoelectric Conversion Capability)

First, the initial photoelectric conversion efficiency was measured with respect to the photoelectric conversion devices and then the initial photoelectric conversion efficiency was measured after the photoelectric conversion devices were allowed to stay for 1000 h at 85° C. The decrease ratio of photoelectric conversion efficiency was then calculated on the basis of these two values of photoelectric conversion efficiency and photoelectric conversion capability was evaluated.

In Table 1, the symbols "⊙", "○", and "x" relating to photoelectric conversion capability have the following meaning:

⊙: decrease ratio of photoelectric conversion efficiency is equal to or less than 30%;
○: decrease ratio of photoelectric conversion efficiency is greater than 30% and equal to or less than 50%;
x: decrease ratio of photoelectric conversion efficiency is greater than 50%.

TABLE 1

| | Inorganic sealing portion | Resin sealing portion | Second resin | Photoelectric conversion capability |
|---|---|---|---|---|
| Example 1 | Low-melting-point glass frit | Ionomer | — | ○ |
| Example 2 | Low-melting-point glass frit | Polyethylene modified with maleic anhydride | — | ○ |
| Example 3 | Low-melting-point glass frit | Ethylene-vinyl alcohol copolymer | — | ○ |
| Example 4 | Low-melting-point glass frit | Ionomer | Vinyl alcohol polymer | ⊙ |
| Example 5 | Low-melting-point glass frit | Polyethylene modified with maleic anhydride | Vinyl alcohol polymer | ⊙ |
| Example 6 | Low-melting-point glass frit | Ethylene-vinyl alcohol copolymer | Vinyl alcohol polymer | ⊙ |
| Example 7 | Low-melting-point glass frit | Ionomer | UV-cured resin | ⊙ |
| Example 8 | Low-melting-point glass frit | Ionomer | Ethylene-methacrylic acid copolymer | ⊙ |
| Example 9 | Low-melting-point glass frit | Ethylene-methacrylic acid copolymer | Ethylene-methacrylic acid copolymer | ⊙ |
| Example 10 | Low-melting-point glass frit | Ionomer | Ionomer | ⊙ |
| Example 11 | Low-melting-point glass frit | UV-cured resin | Vinyl alcohol polymer | ⊙ |
| Example 12 | Low-melting-point glass frit | UV-cured resin | Ethylene-methacrylic acid copolymer | ⊙ |
| Example 13 | Low-melting-point glass frit | UV-cured resin | UV-cured resin | ⊙ |
| Example 14 | Low-melting-point glass frit | UV-cured resin | Ionomer | ⊙ |
| Example 15 | Low-melting-point glass frit | Vinyl alcohol polymer | UV-cured resin | ⊙ |
| Example 16 | Low-melting-point glass frit | Vinyl alcohol polymer | Ionomer | ⊙ |
| Example 17 | Low-melting-point glass frit | Vinyl alcohol polymer | Ethylene-methacrylic acid copolymer | ⊙ |
| Example 18 | Low-melting-point glass frit | Vinyl alcohol polymer | Vinyl alcohol polymer | ⊙ |
| Comparative Example 1 | — | Ionomer | — | X |
| Comparative Example 2 | — | Ethylene-vinyl alcohol copolymer | — | X |
| Comparative Example 3 | — | Ionomer | UV-cured resin | X |
| Comparative Example 4 | — | Ethylene-vinyl alcohol copolymer | UV-cured resin | X |
| Comparative Example 5 | — | Ionomer | Vinyl alcohol polymer | X |
| Comparative Example 6 | — | Ethylene-vinyl alcohol copolymer | Vinyl alcohol polymer | X |

The results shown in Table 1 demonstrate that the photoelectric conversion devices of Examples 1 to 8 are superior in terms of photoelectric conversion efficiency to the photoelectric conversion devices of Comparative Examples 1 to 6. In other words, variation of photoelectric conversion efficiency with time in the photoelectric conversion devices of Examples 1 to 8 can be greatly inhibited in comparison with that in the photoelectric conversion devices of Comparative Examples 1 to 6. This effect is particularly remarkable in the case in which the second resin is provided around the sealing portion.

As described above, it is confirmed that with the photoelectric conversion device in accordance with the present invention, variations in photoelectric conversion efficiency with time can be significantly inhibited.

EXPLANATION OF REFERENCE NUMERALS

| | |
|---|---|
| 1, 802 | working electrodes (electrodes) |
| 2, 702, 801 | counter electrodes (electrodes) |
| 3 | electrolytic solution |
| 4, 204, 304, 404, 504, 604, 704, 804 | sealing portion |
| 4A, 204A | inorganic sealing portion |
| 4B | resin sealing portion |
| 5 | second resin |
| 11 | current-collecting wiring (inorganic sealing portion) |
| 12 | wiring protection layer (inorganic sealing portion) |
| 100, 200, 300, 400, 500, 600, 700, 800 | photoelectric conversion device |
| 704A | second wiring portion |
| 704B | second resin sealing portion |
| 711 | second current-collecting wiring (inorganic sealing portion) |
| 712 | second wiring protection layer (inorganic sealing portion) |

The invention claimed is:

1. A photoelectric conversion device comprising:
a pair of electrodes;
an electrolytic solution disposed between the pair of electrodes; and
a sealing portion that links the pair of electrodes and is provided around the electrolytic solution, wherein
at least part of the sealing portion comprises
at least one inorganic sealing portion constituted by an inorganic material and
at least one resin sealing portion constituted by a material including a first resin,
the inorganic sealing portion and the resin sealing portion are disposed along a direction connecting the pair of electrodes,
the pair of electrodes has a first electrode and a second electrode, the second electrode having a first surface facing the first electrode, a second surface which is on the opposite side of the first electrode and a third surface which links the first surface and the second surface,
in the sealing portion, the inorganic sealing portion is fixed directly on the first electrode and not fixed directly on the second electrode,
the resin sealing portion links the inorganic sealing portion and the second electrode, and
a second resin that at least covers a boundary of the sealing portion and the second electrode, a boundary of the inorganic sealing portion and the resin sealing portion, and the third surface of the second electrode, the second resin being provided on an opposite side of the sealing portion to the electrolytic solution.

2. The photoelectric conversion device according to claim 1, wherein
the at least one inorganic sealing portion is constituted by a wiring portion fixed on the first electrode,
the wiring portion has a current-collecting wiring constituted by an inorganic material and provided on the first electrode and a wiring protection layer covering the current-collecting wiring, and
the first electrode is a transparent electrode.

3. The photoelectric conversion device according to claim 1, wherein
the pair of electrodes comprises one electrode including the first electrode and another electrode including the second electrode, the one electrode or the other electrode further has a photoelectric conversion portion that is in contact with the electrolytic solution,
a working electrode is formed of the first electrode or the second electrode and the photoelectric conversion portion, and
a counter electrode is formed of the second electrode, if the one electrode has the photoelectric conversion portion, or the first electrode, if the other electrode includes the photoelectric conversion portion.

4. The photoelectric conversion device according to claim 1, wherein the second resin at least covers a boundary of the sealing portion and the first electrode.

5. The photoelectric conversion device according to claim 1, wherein
the second resin comprises at least one species selected from the group consisting of an acid-modified polyethylene and a resin cured by ultraviolet ray.

6. The photoelectric conversion device according to claim 1, wherein
the second resin comprises at least one species selected from the group consisting of polyvinyl alcohol and an ethylene-vinyl alcohol copolymer.

7. The photoelectric conversion device according to claim 1, wherein
the first resin comprises at least one species selected from the group consisting of an acid-modified polyethylene and a resin cured by ultraviolet ray.

8. The photoelectric conversion device according to claim 1, wherein
the first resin comprises at least one species selected from the group consisting of polyvinyl alcohol and an ethylene-vinyl alcohol copolymer.

9. The photoelectric conversion device according to claim 1, wherein the second resin further covers the second surface of the second electrode.

10. The photoelectric conversion device according to claim 1, wherein the second resin includes chemical repeating units identical to the chemical repeating units in the first resin.

11. The photoelectric conversion device according to claim 1, wherein the first resin and the second resin comprise an acid-modified polyethylene.

* * * * *